(12) United States Patent
Gosvener

(10) Patent No.: US 8,786,143 B2
(45) Date of Patent: Jul. 22, 2014

(54) MAGNETICALLY ACTUATED RECIPROCATING MOTOR AND PROCESS USING REVERSE MAGNETIC SWITCHING

(76) Inventor: Kendall C. Gosvener, Visalia, CA (US)

( * ) Notice: Subject to any disclaimer, the term of this patent is extended or adjusted under 35 U.S.C. 154(b) by 254 days.

(21) Appl. No.: 13/176,603

(22) Filed: Jul. 5, 2011

(65) Prior Publication Data

US 2012/0007449 A1      Jan. 12, 2012

Related U.S. Application Data

(63) Continuation-in-part of application No. 12/832,928, filed on Jul. 8, 2010, now Pat. No. 8,324,763.

(51) Int. Cl.
*H02K 41/00* (2006.01)
*H02K 41/03* (2006.01)

(52) U.S. Cl.
USPC .................. 310/14; 310/15; 310/23; 310/30; 310/37

(58) Field of Classification Search
CPC ....................................................... H02K 41/03
USPC ..................................... 310/14, 15, 23, 30, 37
IPC ..................... H02K 44/00, 41/00, 33/00, 35/00, H02K 7/06
See application file for complete search history.

(56) References Cited

U.S. PATENT DOCUMENTS

| | | | |
|---|---|---|---|
| 2,718,699 A * | 9/1955 | Soss ............................ 30/272.1 |
| 3,676,719 A | 7/1972 | Pecci |
| 3,740,597 A | 6/1973 | Mulasmajic |
| 3,811,058 A | 5/1974 | Kiniski |
| 3,967,146 A | 6/1976 | Howard |
| 4,011,477 A | 3/1977 | Scholin |
| 4,207,773 A | 6/1980 | Stahovic |
| 4,317,058 A * | 2/1982 | Blalock ........................... 310/24 |
| 4,319,211 A * | 3/1982 | Ueda et al. ..................... 335/229 |
| 4,507,579 A | 3/1985 | Turner |
| 4,631,455 A | 12/1986 | Taishoff |
| 4,749,893 A | 6/1988 | Reynolds |
| 5,457,349 A | 10/1995 | Gifford |
| 5,592,036 A | 1/1997 | Pino |
| 6,147,422 A * | 11/2000 | Delson et al. .................... 310/14 |
| 6,278,204 B1 * | 8/2001 | Frenette ........................... 310/24 |

(Continued)

FOREIGN PATENT DOCUMENTS

| | | | |
|---|---|---|---|
| DE | 3117505 A1 | 11/1982 |
| EP | 569717 A1 | 11/1993 |
| JP | 63006267 A | 1/1988 |
| JP | 63099758 A | 5/1988 |

*Primary Examiner* — Terrance Kenerly
(74) *Attorney, Agent, or Firm* — Richard A. Ryan

(57) ABSTRACT

A magnetically actuated reciprocating motor utilizes the stored energy of permanent magnets and an electromagnetic field to reciprocally drive a magnetic actuator. A converting mechanism converts the reciprocating motion of the magnetic actuator to rotary motion for powering a work object. A solenoid, comprising a nonferromagnetic spool having a tubular center section with a coil of wire wrapped around the center section, is connected to a source of power and a switching mechanism. The magnetic actuator has permanent magnets disposed inside a tubular shaft at each end thereof. The switching mechanism switches the magnetic polarity at the ends of the solenoid to alternatively repel and attract the permanent magnets. The shaft is reciprocatively received through the center section of the solenoid. A controlling mechanism interconnects an output shaft, rotatably powered by the magnetic actuator, and the switching mechanism to switch the polarity of the solenoid to drive the magnetic actuator.

20 Claims, 14 Drawing Sheets

(56) References Cited

U.S. PATENT DOCUMENTS

| | | |
|---|---|---|
| 6,552,450 B2 | 4/2003 | Harty et al. |
| 6,598,621 B1 | 7/2003 | Wygnanski |
| 6,607,370 B2 | 8/2003 | Fukamachi et al. |
| 6,749,409 B2 | 6/2004 | Fukamachi et al. |
| 7,330,094 B2 * | 2/2008 | McCarthy .................. 335/306 |
| 7,557,473 B2 | 7/2009 | Butler |
| 2008/0042496 A1 * | 2/2008 | Chiou .......................... 310/15 |
| 2009/0090334 A1 * | 4/2009 | Hyde et al. ................ 123/51 R |

\* cited by examiner

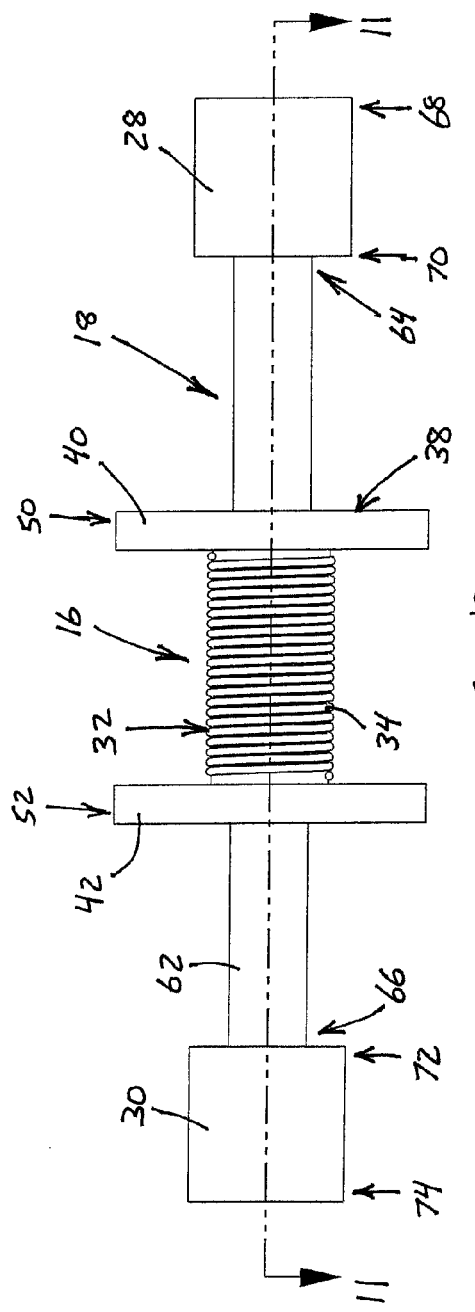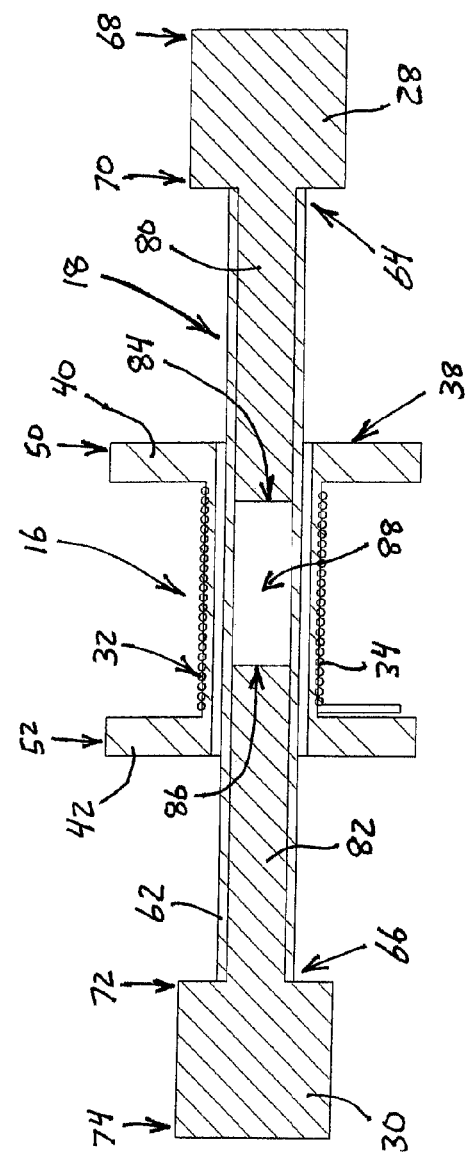

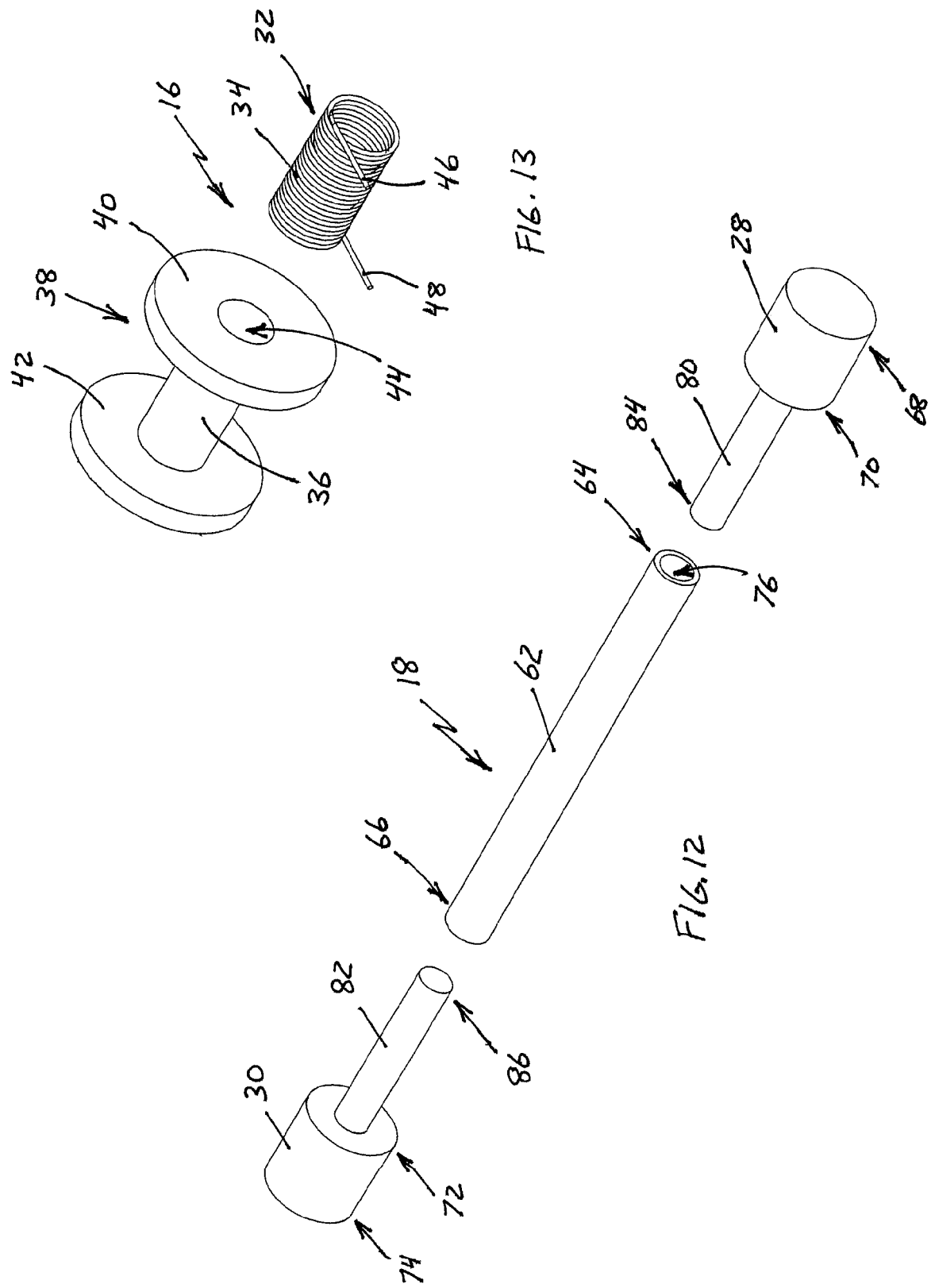

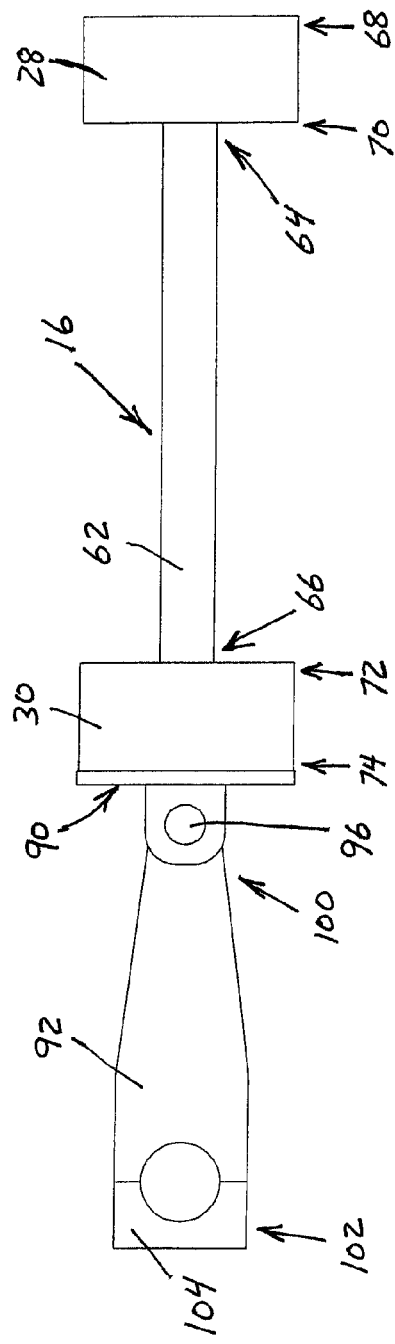
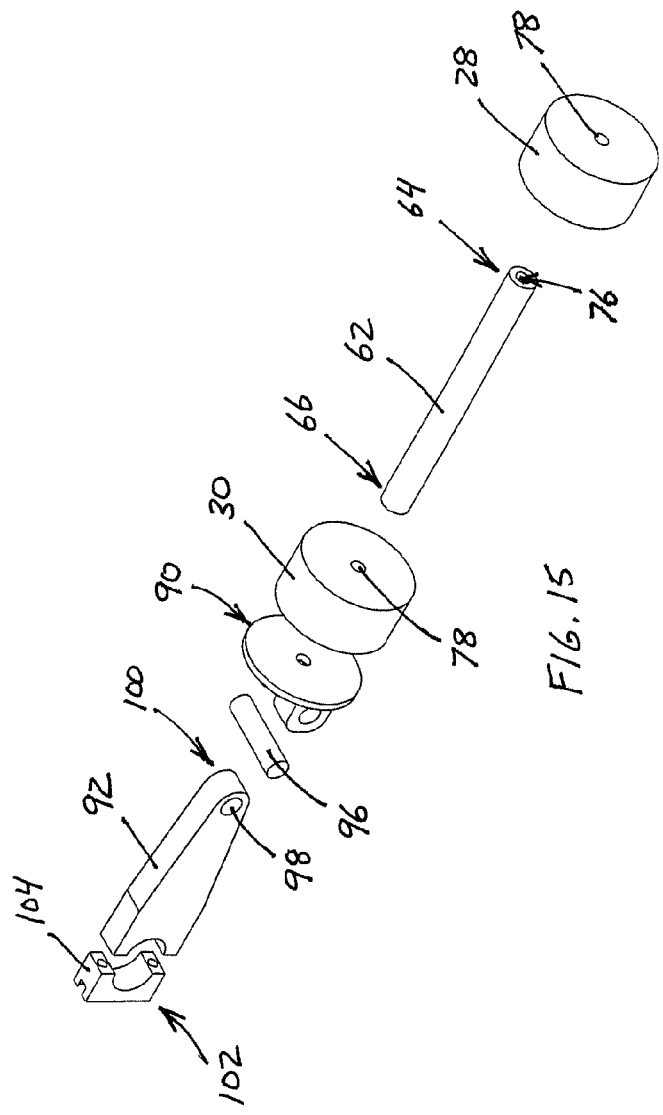
FIG. 14
FIG. 15

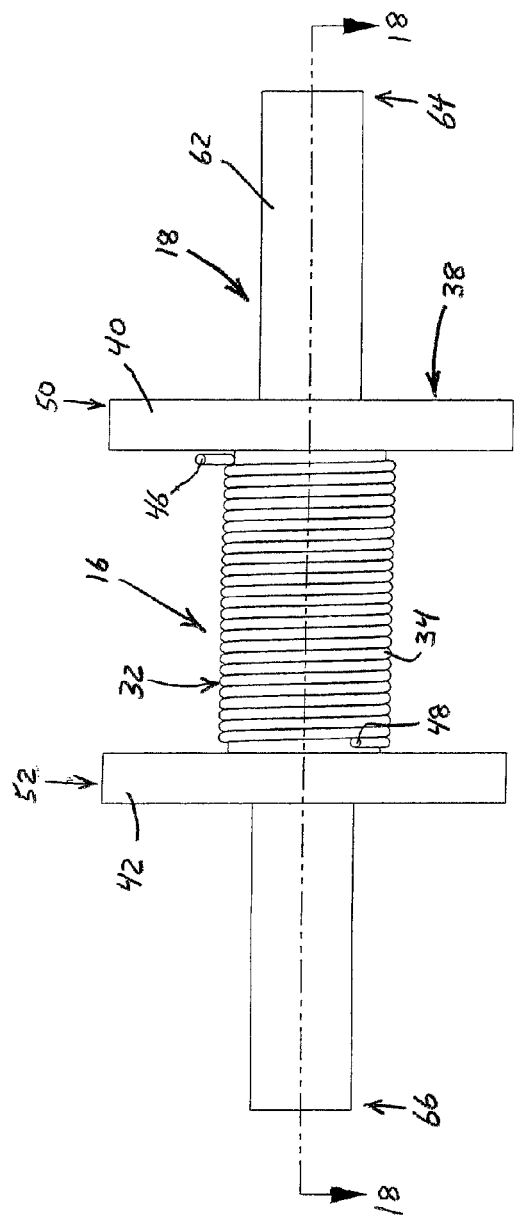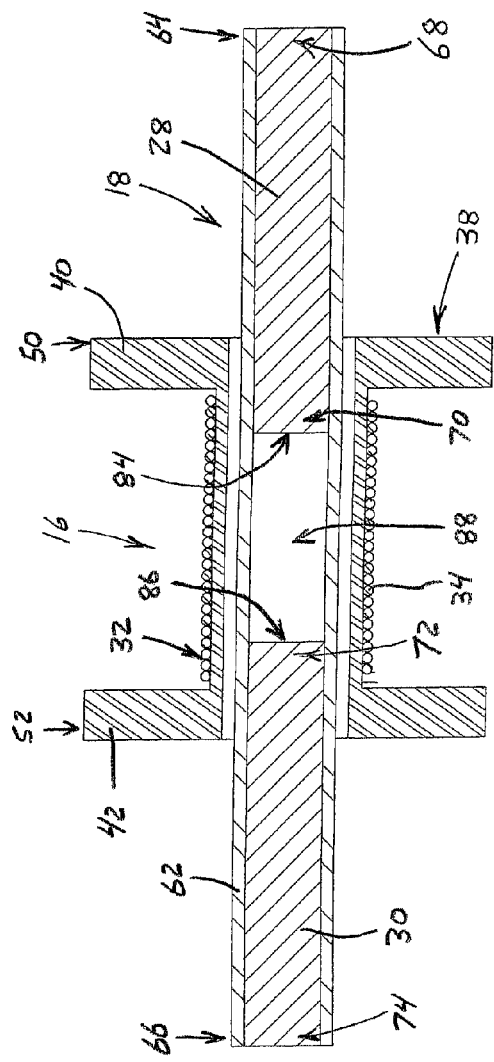

MAGNETICALLY ACTUATED RECIPROCATING MOTOR AND PROCESS USING REVERSE MAGNETIC SWITCHING

CROSS-REFERENCE TO RELATED APPLICATIONS

This patent application is a continuation-in-part of U.S. patent application Ser. No. 12/832,928 filed Jul. 8, 2010, which issued as U.S. Pat. No. 8,324,763 on Dec. 4, 2010.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to reciprocating motors which utilize a drive mechanism to provide power to an output shaft or crankshaft. More particularly, the present invention relates to such motors in which the magnetic repelling and attracting forces of permanent magnets are utilized to reciprocate a magnetic actuator. Even more particularly, the present invention relates to such motors in which the change in direction of the actuator is obtained by utilizing an axially charged solenoid to alternatively repel or attract the actuator.

B. Background

Reciprocating motors have been and continue to be used in virtually every available mode of transportation and for all types of power supply needs throughout the entire world. Generally, reciprocating motors have a piston slidably disposed in a cylinder and utilize a driving force to drive the piston in one or both directions inside the cylinder so as to rotate an output shaft, such as a crankshaft. The most commonly utilized reciprocating motor is an internal combustion engine. The typical internal combustion engine comprises a series of cylinders each having a piston reciprocating inside to drive a crankshaft in order to produce motion or power. Air and fuel are combined in the piston chamber, defined inside the cylinder by the top of the piston, and ignited by a spark from a spark plug to provide an explosive driving force that drives the piston downward. The fuel and air are fed into the piston chamber through an intake valve and, after combustion, exhaust air is forced out through an exhaust valve. To obtain proper performance of the fuel/air igniting sequence, the valve activating mechanism must open and close the intake and exhaust valves at the proper times. Due to relatively high engine operating speeds, this process happens at a very fast rate. Due to their extensive use, the internal combustion engine has been the subject of intensive efforts in the United States and most industrialized countries since the beginning of their utilization to improve the engine's operating characteristics. Despite these efforts, internal combustion engines are well known for relatively inefficient utilization of fuel, such as gasoline and other products made from oil, and being significant contributors to the air pollution problems that exist in most cities and towns. As such, the continued use of internal combustion engines is recognized by many persons as a significant draw on the Earth's limited natural resources and a substantial threat to human health.

Other types of reciprocating devices are also well known. For instance, electromagnetic reciprocating engines utilize electromagnetic force as the driving force to move the piston inside the cylinder and rotate the output shaft. A typical configuration for such engines comprises a plurality of electromagnets disposed around the cylinder that are actuated by electrical currents to provide the electromagnetic force necessary to drive the piston in a reciprocating motion in the cylinder. It is well known that this type of electromagnetic engine must have a somewhat large supply of electrical current to power the electromagnets and typically requires a complex control mechanism to provide the electrical current to the electromagnets in a manner required to operate the engine. For these and other practical reasons, electromagnetic reciprocating engines have generally not become very well accepted.

Another source of power that has been utilized to reciprocate a piston inside a cylinder is the magnetic energy stored in permanent magnets. As is well known, when the same polarity ends of two magnets are placed near each other the repulsion force of the two magnetic fields will repel the magnets and, conversely, when the opposite polarity ends of two magnets are placed near each other the attraction force of the magnetic fields will attract the magnets toward each other, assuming one or both of the magnets are allowed to move. A known advantage of utilizing permanent magnets as the driving force for a reciprocating motor is that the energy available from these magnets is relatively constant and capable of providing a long operating life. In order to use permanent magnets to reciprocally drive a piston inside a cylinder, however, a mechanism must be provided that first utilizes the advantage of dissimilar polarity to attract the piston to the permanent magnet and then utilize the advantage of similar polarity to drive the piston away from the permanent magnet. Naturally, this must be done in a very rapid manner at the proper time. The difficulties with being able to rapidly switch polarity when using permanent magnets, as opposed to electromagnetic force, has heretofore substantially limited the ability to utilize the advantages of permanent magnets as a driving force to reciprocate a piston in a cylinder so as to rotate an output shaft for the purposes of motion or the generation of electricity.

Over the years, various reciprocating devices that utilize permanent magnets as the driving force to reciprocate a piston or other actuating devices, to one extent or another, have been patented. For instance, U.S. Pat. No. 3,676,719 to Pecci discloses a electromagnetic motor having an electromagnetic solenoid, located within a concentric counterbore, having a coil disposed about an inner sleeve and electromagnetic insulating end walls at the ends thereof. A ferrous metal core is slidably received in the inner sleeve and reciprocates in response to electromagnetic force to rotate a drive shaft. U.S. Pat. No. 3,811,058 to Kiniski discloses a reciprocating device comprising an open-bottomed cylinder having a piston made out of magnetic material, with a predetermined polarity, slidably disposed in the cylinder chamber. A disc rotatably mounted to the engine block below the cylinder has at least one permanent magnet, of like polarity, on the surface facing the open bottom of the cylinder such that the rotation of the disc periodically aligns the permanent magnet with the piston so the repulsive force therebetween causes the piston to reciprocate in the cylinder chamber. U.S. Pat. No. 3,967,146 to Howard discloses a magnetic motion conversion motor having permanent magnets arranged with like poles facing each other and a magnetic flux field suppressor disposed between the magnets for repeatedly causing a magnetic repelling and attracting action as it is moved into alignment between the like poles of the magnets. The magnets reciprocally drive piston rods connected to crankshafts that are connected to a common drive shaft, as the main output shaft. U.S. Pat. No. 4,317,058 to Blalock discloses an electromagnetic reciprocating engine having a nonferromagnetic cylinder with a permanent magnetic piston reciprocally disposed therein and an electromagnet disposed at the outer end of the cylinder. A switching device, interconnecting the electromagnet to an electrical power source, causes the electromagnet to create an electrical field that reciprocates the piston within the cylinder. U.S. Pat. No. 4,507,579 to Turner discloses a reciprocating piston electric motor having a magnetic piston slidably disposed in a nonmagnetic cylinder that has wire coils wrapped around the ends thereof that are electrically activated to reciprocate the piston inside the cylinder to drive a crankshaft connected to the piston by a piston rod. U.S. Pat. No. 5,457,349 to Gifford discloses a reciprocating electromagnetic magnetic engine having fixed magnets mounted in the piston that intermittently attract and repel sequentially energized electromagnets that are radially mounted in the cylinder walls. A computerized control mechanism regulates the timing of the electromagnets to reciprocate the piston and drive a rotatable crankshaft. U.S. Pat. No. 6,552,450 to Harty, et al. discloses a reciprocating engine having a piston, which is reciprocally disposed in a cylinder, that is driven by opposing electromagnets connected with the piston and cylinder. A polarity switching mechanism switches polarity to reciprocate the piston. U.S. Pat. No. 7,557,473 to Butler discloses an electromagnetic reciprocating engine comprising an electromagnet with opposing magnetic poles disposed between permanent magnets mounted on either ends of a moving frame connected to a crankshaft. Magnetic attraction and repulsion forces are used to reciprocate the frame and rotate the crankshaft.

One of the major disadvantages associated with previously disclosed or presently available permanent magnet reciprocating motors is that mechanism for switching polarity to reciprocally drive the piston in the cylinder generally utilize one or more electromagnets, which use a switching mechanism interconnecting a power source with the electromagnets. A significant problem with the use of an electromagnet to reciprocate a piston to or away from a permanent magnet is that the force field of the permanent magnet is strongly attracted to the iron core of the electromagnet. This strong magnetic attraction force makes it very difficult, if not impossible, for the magnetic repelling force to overcome the attraction between the permanent magnet and the iron core, thereby eliminating the repel step (of the attract/repel action) that is necessary to reciprocate the piston in response to the magnetic switching. If the strong magnetic attraction between the permanent magnet and the iron core can be overcome, it requires an excessive amount of energy for the electromagnet. Other devices utilize an electric motor or other prime mover to rotate or pivot a member having the permanent magnets so as to periodically attract or repel magnets on the piston to provide the force necessary for reciprocating the piston. Naturally, the use of an external prime mover substantially reduces the energy efficiency of the magnetically actuated reciprocating motor and, therefore, one of the primary benefits of such motors. Another major disadvantage that is associated with presently available magnetically actuated reciprocating motors is that the switching mechanisms are generally somewhat complicated and subject to malfunction or cessation of operation.

What is needed, therefore, is an improved magnetically actuated reciprocating motor that has an improved mechanism for switching polarities so as to periodically attract and repel a piston-like magnetic actuator to reciprocally move the actuator and rotatably drive an output shaft. An improved reciprocating motor will not utilize iron core electromagnets to attract and repel the magnetic actuator toward or away from a permanent magnet so as to avoid excessive attraction between the permanent magnet and iron core. The reciprocating motor should not rely on a prime mover or the like to reciprocate permanent magnets from an attracting position to a repelling position so as to reciprocally drive a piston disposed in a cylinder. The preferred reciprocating motor should be simple to operate, require a limited number of moving components and be relatively inexpensive to manufacture. The preferred reciprocating motor should connect to a crankshaft or other output shaft to produce rotary power and be adaptable to a wide variety of reciprocating motor uses, including vehicle motion and power generation.

SUMMARY OF THE INVENTION

The magnetically actuated reciprocating motor of the present invention solves the problems and provides the benefits identified above. That is to say, the present invention discloses a new and improved reciprocating motor that utilizes a solenoid to provide electromagnetic force to reciprocatively move an elongated magnetic actuator having a permanent magnet at each of its ends, with the polarity of the electromagnetic force being alternated to reciprocate the magnetic actuator and drive an output shaft. The coil of the solenoid is wrapped around a nonferrous spool that is fixedly held in position. One or more shafts of the actuator linearly move inside the spool in response to one of the permanent magnets of the magnetic actuator being repelled by the solenoid while the other permanent magnet is being drawn toward the solenoid. The present magnetically actuated reciprocating motor does not utilize an electromagnet and, as a result, eliminates the problems associated with the permanent magnets being attracted to the iron core of the electromagnet, which can result in loss efficiency and even non-movement of the magnetic actuator. The solenoid rapidly alternates polarity to magnetically attract and repel the permanent magnets of the magnetic actuator to reciprocate the actuator and drive the output shaft. The magnetically actuated reciprocating motor of the present invention does not rely on an external source of power, such as a prime mover or the like, to pivot, rotate or otherwise move the permanent magnets from an attracting position to a repelling position in order to reciprocally drive the magnetic actuator. The new reciprocating motor is relatively simple to operate, requires a limited number of moving components and is relatively inexpensive to manufacture. The magnetically actuated reciprocating motor of the present invention connects to a crankshaft so as to produce rotary power that is adaptable to a wide variety of reciprocating motor uses, including vehicle motion (whether by land, air or water) and power generation.

In one general aspect of the present invention, the magnetically actuated reciprocating motor comprises a frame, a solenoid fixedly supported by the frame, a source of power electrically connected to the solenoid to energize the solenoid, a switching mechanism that electrically interconnects the source of power and solenoid, a magnetic actuator that reciprocates relative to the solenoid in response to the electromagnetic field of the solenoid, a mechanism operatively connected to the magnetic actuator for converting reciprocating movement of the magnetic actuator to rotate a work object, such as flywheel, attached to an output shaft and a mechanism that interconnects an output shaft with the switching mechanism for controlling operation and timing of the switching mechanism. In one embodiment, the frame defines a chamber and the solenoid is supported by the frame in the chamber. In another embodiment, the frame is a housing that substantially encloses the motor of the present invention. The solenoid has a first end, an opposite directed second end, a spool with a tubular center section disposed between its first end and second end and a coil of wire wrapped around the center section. The center section of the spool has a generally open center through which a portion of the magnetic actuator reciprocates. The spool is made out of one or more nonferromagnetic materials. Unlike electromagnets, the solenoid of the present invention does not have a ferromagnetic core. The solenoid is configured to have a first polarity at the first end and a second polarity at the second end in its first energized state and have the second polarity at the first end and the first polarity at the second end in its second energized state. The switching mechanism alternatively switches the solenoid between the first energized state and the second energized state. The magnetic actuator has an elongated shaft with a first end and a second end, a first permanent magnet at the first end of the shaft and a second permanent magnet at the second end of the shaft. The shaft is reciprocatively received in the open center of the coil. The first permanent magnet has an end disposed toward the first end of the solenoid that is magnetically charged with an actuator polarity that is one of the first polarity and the second polarity. The second permanent magnet has and end disposed toward the second end of the solenoid that is also magnetically charged with the actuator polarity. In a preferred embodiment, the mechanism for converting the reciprocating movement of the magnetic actuator to rotate the work object has a first output shaft and a second output shaft. In a preferred embodiment, the controlling mechanism for controlling the operation and timing of the switching mechanism is attached to the first output shaft. The flywheel or other work object can be attached to the second output shaft.

In one embodiment, the shaft has a tubular chamber, the first permanent magnet has a first extension member with an inward end extending into the tubular chamber from the first end of the shaft and the second permanent magnet has a second extension member with an inward end extending into the tubular chamber from the second end of the shaft. The inward end of the first extension member is disposed in spaced apart relation with the inward end of the second extension member to define a gap between the first extension member and the second extension member in the tubular chamber of the shaft.

In a preferred embodiment, the magnetic actuator has an elongated tubular shaft with one or more walls defining a tubular chamber between the first and second ends of the shaft. The first permanent magnet is disposed inside the tubular chamber at the first end of the shaft and the second permanent magnet is disposed inside the tubular chamber at the second end of the shaft. In this embodiment, both of the permanent magnets are substantially disposed entirely inside the tubular shaft, with a gap separating the second end of the first permanent magnet and the first end of the second permanent magnet. As with the above embodiment, the reverse magnetic switching that switches the polarity of the ends of the solenoid will reciprocatively drive the magnetic actuator to produce the desired work. This configuration has been found to improve the performance of the motor of the present invention.

In one embodiment, the controlling mechanism that controls the operation and timing of the switching mechanism is a cam attached to the first output shaft so as to rotate therewith. In another embodiment, the controlling mechanism is a split commutator having a pair of split disks and a pair of solid disks, with each of the disks being separated by a disk insulator. The switch that receives the input power from the source of power, such as a battery or the like, is operatively engaged with the solid disks and the switch that directs the output power to the solenoid is operatively engaged with the split disks. The rotation of the split and solid disks provides the desired reverse magnetic switching. In another embodiment, the controlling mechanism is an electronic drive assembly comprising a control unit operatively connected to a half bridge driver, bus transistor and user interface to transfer the electrical power from the source of power to the solenoid in a manner that provides the reverse magnetic switching that drives the magnetic actuator.

As stated above, the solenoid comprises a coil made up of a wire, preferably a copper wire with a thin enamel-based insulated covering, wrapped around the center section of the spool to provide, when energized, an axially charged electromagnetic field. The coil has a longitudinal axis, defined by the tubular-shaped center section having an open center through which the magnetic actuator reciprocates. The shaft of the magnetic actuator has a longitudinal axis that is in axial alignment with the longitudinal axis of the coil. In the preferred embodiment, the permanent magnets at each end of the shaft are axially aligned with the longitudinal axis of both the shaft and the coil. Each of the permanent magnets has an actuator polarity, which is the same for both magnets, that is axially directed toward the solenoid coil disposed between the two magnets. When the coil is energized, it produces opposite magnetic polarity, a first polarity and a second polarity, at the two ends of the solenoid. The polarity at each end of the solenoid is axially directed towards the actuator polarity of their respective opposing permanent magnet. In operation, the switching mechanism periodically switches the polarity at the ends of the solenoid to alternatively repel and attract the magnets at the ends of the magnetic actuator. As one permanent magnet is being attracted to its respective end of the solenoid, the other permanent magnet is being repelled by its respective end of the solenoid. This alternating repel and attract action reciprocates the magnetic actuator to operate the work objective, such as a flywheel, to obtain the desired work output for the motor. In the preferred embodiment, a cam, split commutator, electronic drive assembly or like controlling mechanism is connected to an output shaft and operatively interacts with the switching mechanism to provide the necessary timing for the reverse magnetic switching that reciprocatively drives the magnetic actuator and operates the motor. Other controlling mechanisms, which may or may not be operated by an output shaft, can be utilized to operate the switching mechanism and provide the reverse magnetic switching timing.

Accordingly, the primary objective of the present invention is to provide a magnetically actuated reciprocating motor using reverse magnetic switching that provides the advantages discussed above and overcomes the disadvantages and limitations associated with presently available magnetically powered reciprocating motors.

It is also an important object of the present invention to provide a magnetically actuated reciprocating motor that utilizes electromagnetic force to reciprocate an elongated magnetic actuator having a permanent magnet at each end thereof to drive an output shaft and to generate electricity, propel a vehicle, drive a pump or for other motor uses.

It is also an important object of the present invention to provide a magnetically actuated reciprocating motor that utilizes electromagnetic force to alternatively attract and repel a pair of oppositely positioned permanent magnets mounted on a magnetic actuator that does not utilize an electromagnet so as to eliminate attraction between the permanent magnets and the iron core of the electromagnet.

It is also an object of the present invention to provide a magnetically actuated reciprocating motor that utilizes a solenoid to provide electromagnetic force to reciprocatively drive a magnetic actuator having a shaft linearly disposed inside a nonferrous spool around which is wrapped the solenoid coil.

It is also an object of the present invention to provide a magnetically actuated reciprocating motor that does not require utilization of a prime mover or the like to provide the magnetic switching necessary to magnetically reciprocate a magnetic actuator and drive an output shaft.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention:

FIG. 10 is a side view of a first embodiment of the magnetic actuator utilized with the magnetically actuated reciprocating motor of the present invention;

FIG. 11 is a cross-sectional side view of the magnetic actuator of FIG. 10 taken through line 11-11 of FIG. 10;

FIG. 12 is an exploded side perspective view of the magnetic actuator of FIG. 10;

FIG. 13 is an exploded side perspective view of the solenoid utilized with the preferred embodiment of the magnetically actuated reciprocating motor of the present invention;

FIG. 14 is a side view of the magnetic actuator and connecting rod assembly of the embodiment of the magnetically actuated reciprocating motor of the present invention shown in FIG. 1;

FIG. 15 is an exploded side perspective view of the magnetic actuator and connecting rod assembly shown in FIG. 14;

FIG. 17 is a side view of the preferred embodiment of the magnetic actuator utilized with the magnetically actuated reciprocating motor of the present invention;

FIG. 18 is a cross-sectional side view of the magnetic actuator of FIG. 17 taken through line 18-18 of FIG. 17;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of preferred embodiments and only represent several possible ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, the figures and description provided herein are primarily directed to a single motor, however, those skilled in the art will readily understand that this is merely for purposes of simplifying the present disclosure and that the present invention is not so limited as multiple motors may be utilized together to provide the desired work objective.

Figure 2:
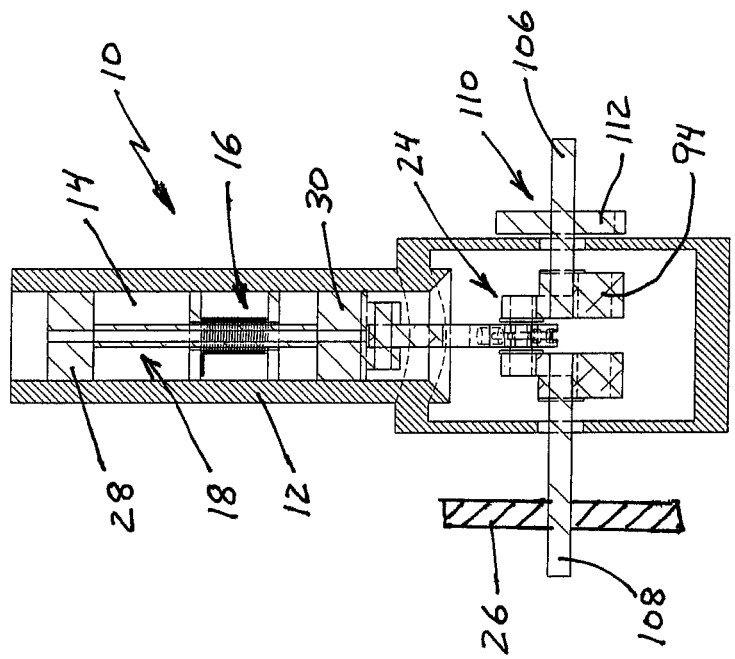
FIG. 2 is a cross-sectional front view of the magnetically actuated reciprocating motor of FIG. 1 taken through line 2-2 of FIG. 1.
Figure 1:
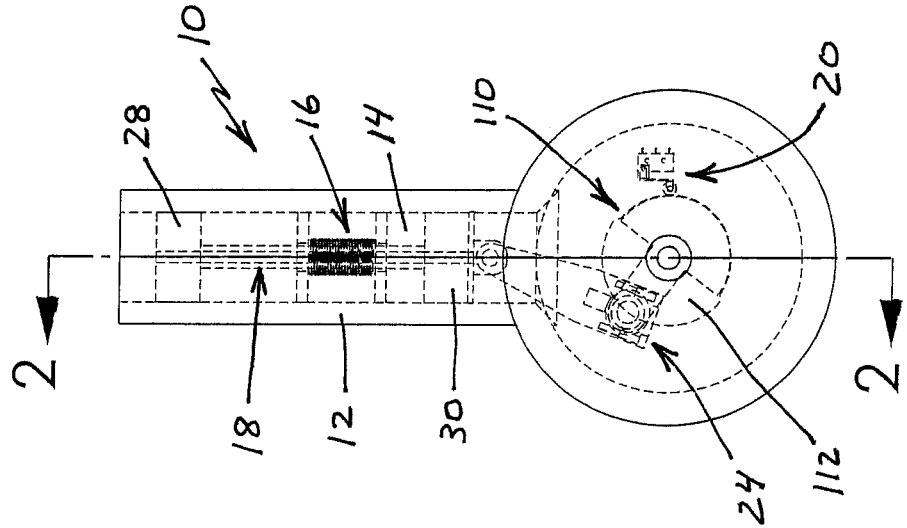
FIG. 1 is a side view of a magnetically actuated reciprocating motor configured according to a first embodiment of the present invention.
Figure 3:
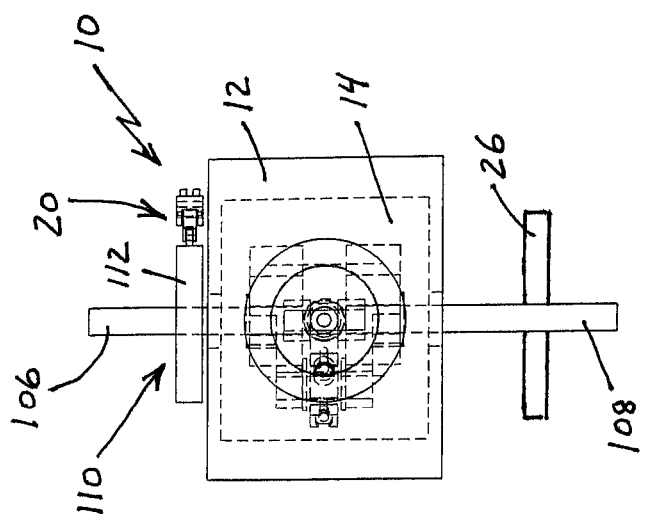
FIG. 3 is a top view of the magnetically actuated reciprocating motor of FIG. 1.

A magnetically actuated reciprocating motor that is manufactured out of the components and configured pursuant to preferred embodiments of the present invention is shown generally as 10 in the figures. As best shown in FIGS. 1 through 3, motor 10 of the present invention generally comprises a frame 12 defining a chamber 14 therein, an axially charged electromagnetic solenoid 16 fixedly supported by the frame 12, a piston-like magnetic actuator 18 reciprocally disposed through solenoid 16, a switching mechanism 20 configured to operate the solenoid 16, a source of power 22 (shown in FIG. 16) that supplies electrical power to the solenoid 16 and a reciprocating converting mechanism 24 that is connected to the magnetic actuator 18 to convert the reciprocating motion of the magnetic actuator 18 to operate a work object 26, such as the flywheel shown in the figures. The work object 26 can be connected to a pump, generator, vehicle or other mechanical device for accomplishing useful work.

As explained in more detail below, during operation of motor 10 the solenoid 16 is energized to provide an axially charged magnetic field with opposing magnetic poles at the opposite ends of solenoid 16 to magnetically repel or attract permanent magnets, identified as first permanent magnet 28 and second permanent magnet 30, on the magnetic actuator 18 to reciprocate the magnetic actuator 18 and rotate the work object 26. In a preferred embodiment, frame 12 is configured as a housing that substantially or entirely encloses the remaining components of motor 10 of the present invention. Unlike an internal combustion engine, however, it is not necessary that frame 12 be configured to provide a sealed, enclosed chamber 14, as no combustion gases or other pressure inducing mechanism is utilized in motor 10 to reciprocally move the magnetic actuator 18. Instead, motor 10 of the present invention utilizes the magnetic repelling and attracting force between the axially charged solenoid 16 and the permanent magnets 28/30 to reciprocate magnetic actuator 18 and drive the work object 26. Preferably, the frame 12, solenoid 16 and magnetic actuator 18 are cooperatively configured such that the travel of the magnetic actuator 18 in chamber 14 is accomplished with a minimum amount of friction to reduce loss of power produced by motor 10. Because motor 10 of the present invention does not utilize gasoline or other fossil fuel based energy sources for its operation, the motor 10 does not require the use of these limited resources or generate the polluting exhaust that is a well known problem of internal combustion engines.

Although frame 12 can have a solid wall and entirely enclose the other components of motor 10, as shown in FIGS. 1 through 3, this configuration is not necessary and, in fact, may not be preferred due to various weight and manufacturing cost considerations. The primary purpose of an enclosed frame 12 is for safety purposes, namely to avoid injury to persons or damage to other equipment that may come in contact with motor 10. If desired, magnetic actuator 18 and reciprocating converting mechanism 24 can be entirely exposed. The solenoid 16 and magnetic actuator 18 should be cooperatively configured so as to direct the movement of the magnetic actuator 18 in a generally linear direction so that as much force as possible is provided to the reciprocating converting mechanism 24 to operate work object 26 (i.e., rotate the flywheel). Because motor 10 of the present invention does not rely on the expansion of compressed gasses for the reciprocation of magnetic actuator 18, frame 12 can be configured in many different ways to accomplish the objectives of the present invention. For instance, in one embodiment frame 12 is configured in a generally open cage or sleeve-like configuration. Due to the magnetic forces generated by solenoid 16 and the permanent magnets 28/30, as set forth below, frame 12 should be made out of nonferromagnetic material, such as aluminum, ceramic, carbon fiber, plastics, thermoplastic resins (such as nylon and polyfluroethylene), carbon composites and a variety of non-magnetic materials. In a preferred embodiment of the present invention, frame 12 is made out of Delrin®. As will be readily understood by those skilled in the art, frame 12 can be configured in a variety of different sizes and shapes, including having a round, square, rectangle or oval cross-section.

As stated above, the solenoid 16 of motor 10 is configured to provide an axially charged electromagnetic field that has poles with opposing polarities at the opposite ends thereof. Unlike prior art magnetically actuated electromagnetic motors, the solenoid 16 of motor 10 is not an electromagnet and does not have an iron or iron-based core. In cooperation with the switching mechanism 20 and the source of power 22, solenoid 16 is configured to alternatively magnetically attract and repel the permanent magnets 28/30 of the magnetic actuator 18 to cause the magnetic actuator 18 to reciprocate and operate the work object 26 so as to produce power, propel a vehicle or perform other useful work. The present inventor has found that the use of an electromagnet significantly reduces the ability of the magnetic actuator 18 to reciprocate due to the strong attraction that would exist between the permanent magnets 28/30 and the electromagnet's iron core, due primarily to the strong magnetic field of the permanent magnets 28/30 on the magnetic actuator 18. This strong attraction would either result in one of the permanent magnets 28/30 being fixedly attracted to the electromagnet, and therefore eliminate any chance of the magnetic actuator reciprocating, or require too much energy from the source of power 22 to overcome, thereby likely making the motor 10 to inefficient to be practical.

Figure 16:
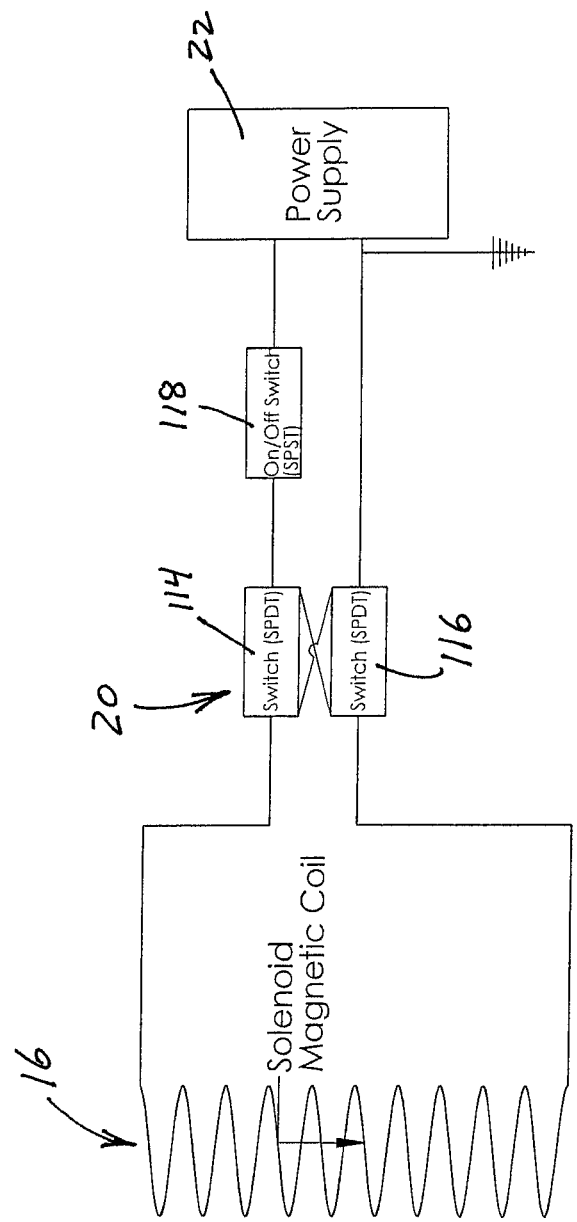
FIG. 16 is a schematic of the electrical system for the solenoid used in a preferred embodiment of the magnetically actuated reciprocating motor of the present invention.

In a preferred embodiment, the solenoid 16 comprises a coil 32 formed of wire 34 that is wrapped around the tubular-shaped center section 36 of a spool 38 having a generally disk-shaped first end section 40 and a generally disk-shaped second end section 42, as best shown in FIGS. 10-13. The center section 36 of spool 38 defines a tubular-shaped open center 44 through which a portion of magnetic actuator 18 is received and reciprocates, as explained below, when magnetically acted upon by the solenoid 16 during operation of motor 10. The wire 34 of coil 32 is wrapped around center section 36 to provide the axially charged magnetic field that alternatively attracts and repels the permanent magnets 28/30 of the magnetic actuator 18. The coil 32 has a first wire end 46 and a second wire end 48, best shown in FIG. 13, that electrically connect to the source of power 22 via one or more switches of the switching mechanism 20, as shown in FIG. 16. The end sections 40/42 of the spool 38 are fixed relative to frame 12. In one embodiment, the end sections 40/42 are attached to, connected to or integral with the section of frame 12 that fixedly positions the solenoid 16 in motor 10. If desired, the frame 12 can be configured in a manner such that it only secures and encloses (whether fully or partially) solenoid 16, thereby leaving the magnetic actuator 18 exposed.

In the preferred embodiment, wire 34 for coil 32 is an insulated electrically conductive copper wire, such as enamel coated magnet wire, that has a thin layer of insulated coating. The gauge and length of the wire to provide the desired electromagnetic field will need to be engineered for a specific application of motor 10. In one embodiment, the inventor has utilized approximately 144 feet of 24 gauge wire to provide approximately 22 layers of wire having approximately 76 turns per layer (for a total of 1,386 turns) around a center section 36 having an outside diameter of approximately 0.75 inches and a length of 1.50 inches. As will be readily appreciated by those skilled in the art, a wide variety of different combinations of wire sizes and coil configurations can be utilized for solenoid 16, with the larger gauges of wire 34 allowing more current, which is needed for large permanent magnets 28/30, but producing more heat. Spool 38 of solenoid 16 should be made out of a nonferromagnetic material so as to avoid interference with the magnetic field generated by the energized solenoid 16 and permanent magnets 28/30 of magnetic actuator 18. In a preferred embodiment, the spool 38 is made out of Delrin® or other thermoplastic material. In one embodiment, the spool 38 has an overall length of approximately 2.00 inches with end sections 40/42 thereof having a thickness of approximately 0.25 inches each and diameter of approximately 2.00 inches. In this embodiment, the center section 36 has an inside diameter of approximately 0.63 inches, which defines the open center 44 through which a portion of the magnetic actuator 18 is received and reciprocates in response to the alternating magnetic polarity at or near the first 40 and second 42 end sections of spool 38.

Figure 6:
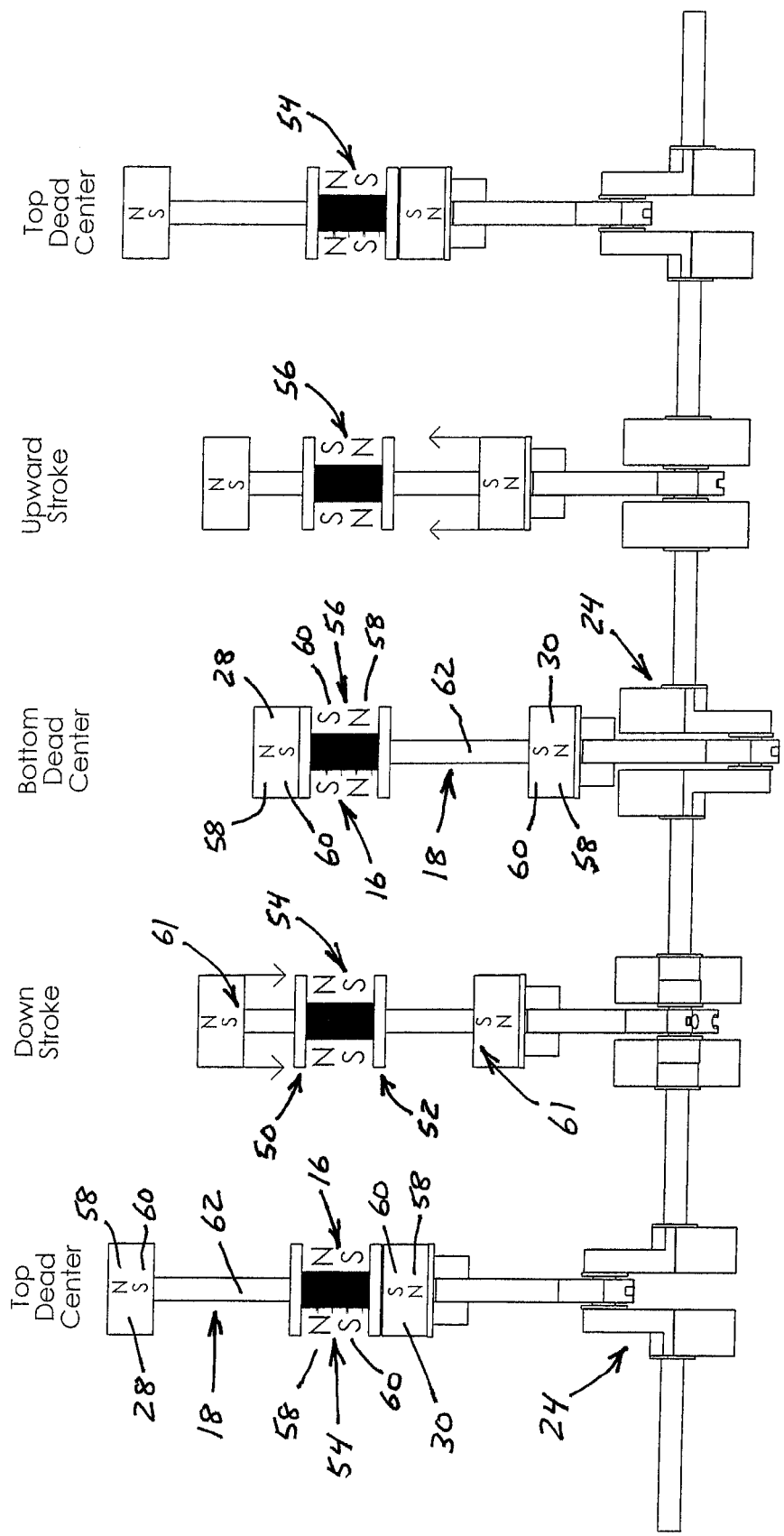
FIG. 6 is a front view of a series of connected magnetically actuated reciprocating motors configured according to an embodiment of the present invention showing the motor through a complete cycle of operation with the permanent magnets positioned with the magnetic pole having a S polarity directed toward the axially charged electromagnetic field of the solenoid.
Figure 7:
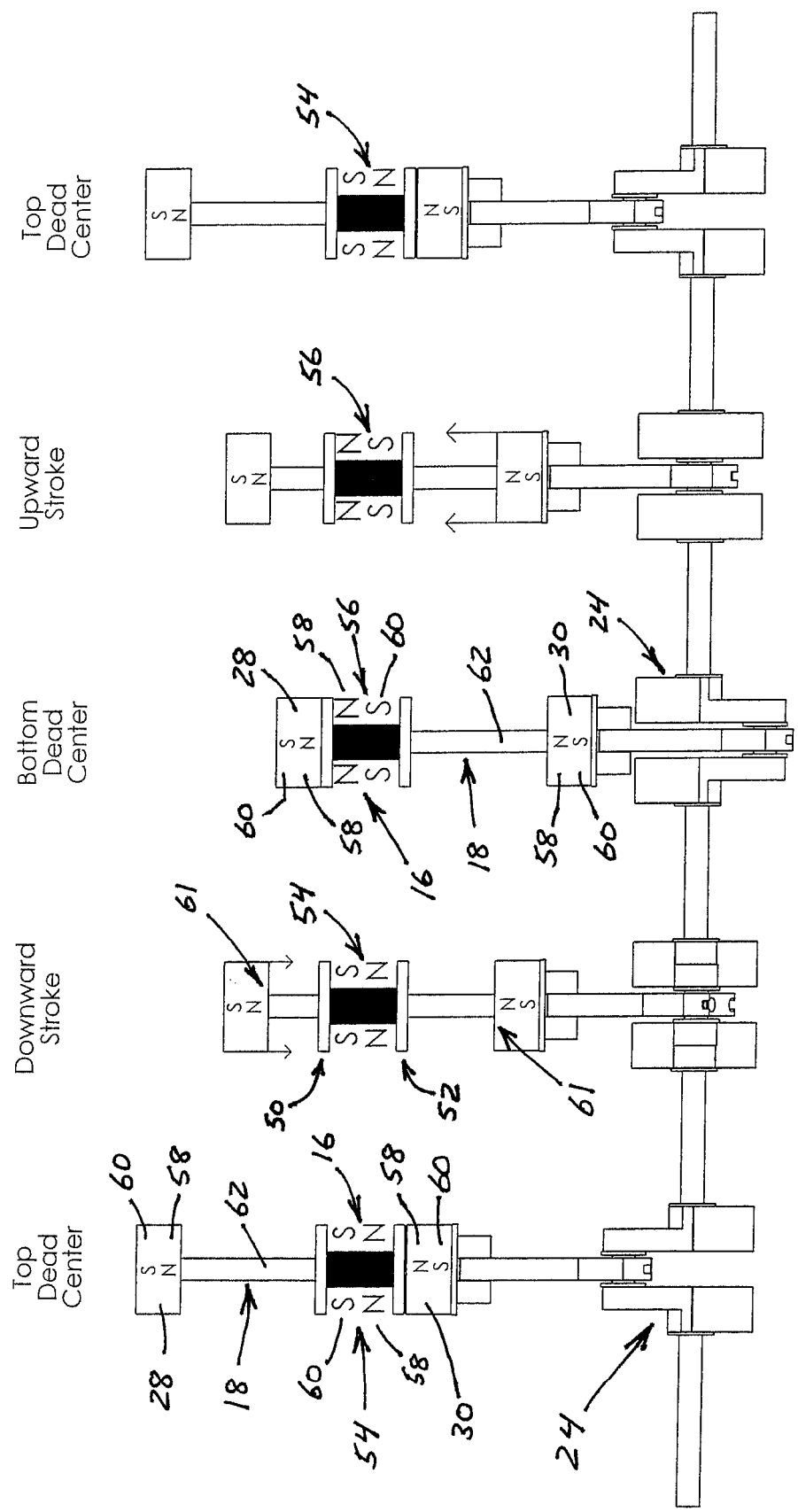
FIG. 7 is a front view of a series of connected magnetically actuated reciprocating motors configured according to an embodiment of the present invention showing the motor through a complete cycle of operation with the permanent magnets positioned with the magnetic pole having a N polarity directed toward the axially charged electromagnetic field of the solenoid.

As set forth in more detail below, the switching mechanism 20 of motor 10 is configured to switch the polarity at the first end 50 and second end 52 of solenoid 16 in an alternating manner to provide a first energized state 54 and a second energized state 56, as illustrated in FIGS. 6 and 7. In the first energized state 54, first end 50 of solenoid 16 will have a first magnetic polarity 58 (shown as N) and the second end 52 of solenoid 16 will have a second magnetic polarity 60 (shown as S). In the second energized state 56, the first end 50 of solenoid 16 will be at the second magnetic polarity 60 and the second end 52 of solenoid 16 will be at the first magnetic polarity 58. Both permanent magnets 28/30 will be positioned such that the solenoid facing magnetic polarity, hereinafter referred to as the actuator polarity 61 (which will be one of 58 or 60), of one end thereof will be generally directed toward the first 50 and second 52 ends of solenoid 16. When switching mechanism 20 rapidly switches between the solenoid's first energized state 54 and its second energized state 56, the magnetic polarity at the ends 50/52 of solenoid 16 will be in corresponding relation (e.g., either the same as or opposite thereof) with actuator polarity 61 (whether 58 or 60) of the facing end of the permanent magnets 28/30 so as to magnetically attract and repel the permanent magnets 28/30 and reciprocate the magnetic actuator 18 relative to the solenoid 16, as shown in the sequence of operation in FIGS. 6 and 7. In FIG. 6 the actuator polarity 61 is S and in FIG. 7 the actuator polarity 61 is N. As will be readily appreciated by those skilled in the art, first magnetic polarity 58 and second magnetic polarity 60 can be opposite that described above as long as they are opposite each other (to attract or repel as required) and both permanent magnets 28/30 have the same actuator polarity 61 facing towards the ends of the solenoid 16.

Figure 8:
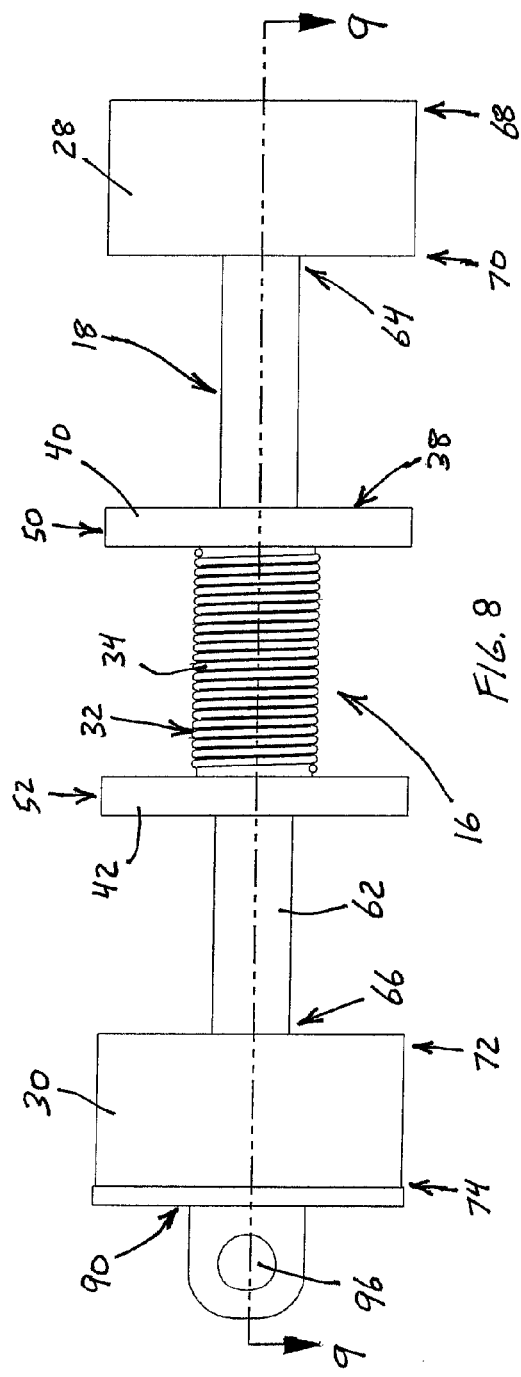
FIG. 8 is a side view of one embodiment of the magnetic actuator and connecting rod connector utilized with the magnetically actuated reciprocating motor of the present invention.
Figure 9:
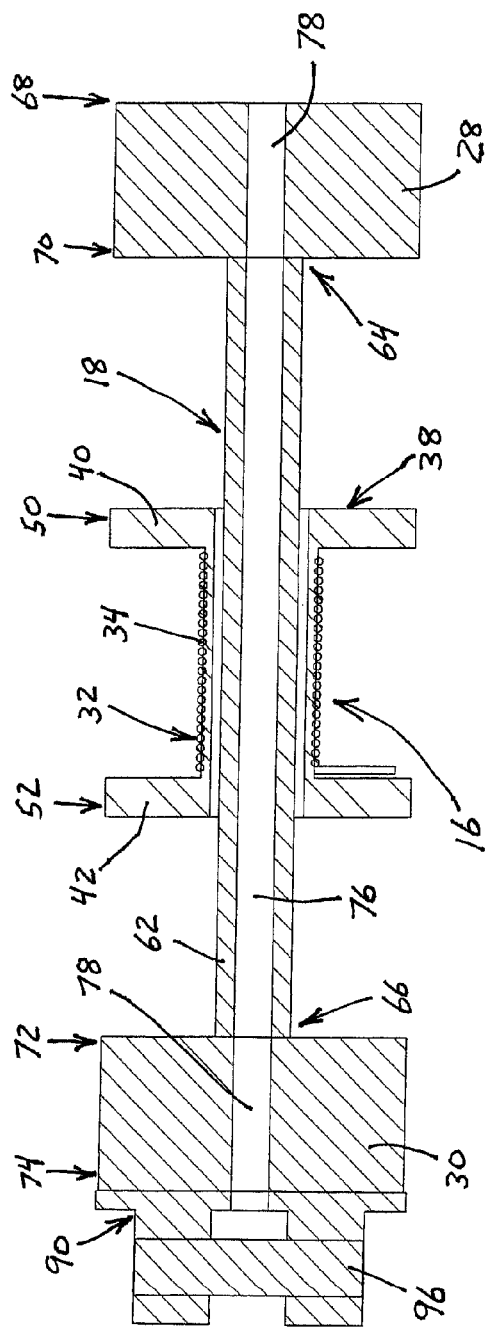
FIG. 9 is a cross-sectional side view of the magnetic actuator and connecting rod connector of FIG. 8 taken through line 9-9 of FIG. 8.

As stated above, the magnetic actuator 18 of the present invention should be sized and configured to be cooperatively received inside solenoid 16 and chamber 14 so as to reciprocate therein with a minimum amount of friction between it and the solenoid 16 and frame 12. In a preferred embodiment, the magnetic actuator 18 comprises an elongated tubular shaft 62 having the first permanent magnet 28 at the first end 64 thereof and the second permanent magnet 30 at the second end 66 thereof, as best shown in FIGS. 8 and 9. The shaft 62 interconnects the two permanent magnets 28/30 and maintains them in a desired spaced apart relation. The outside diameter of shaft 62 is sized and configured to be slidably received inside the open center 44 defined by the center section 36 of spool 38, as best shown in FIG. 9, so the magnetic actuator 18 may freely reciprocate relative to the solenoid 16 and operate the work object 26. The first permanent magnet 28 has a first end 68 and a second end 70 and second permanent magnet 30 has a first end 72 and a second end 74. The second end 70 of the first permanent magnet 28 is at the first end 64 of shaft 62 and the first end 72 of the second permanent magnet 30 is at the second end 66 of shaft 62. The permanent magnets 28/30 can attach to or otherwise connect with the shaft 62 as may be appropriate for the materials utilized for these components.

In the preferred embodiment of the present invention, first permanent magnet 28 and second permanent magnet 30 are rare earth magnets, which are known for their improved magnetic performance and longevity. Rare earth magnets are known to provide the characteristics desired for the operation of reciprocating motor 10 of the present invention. In a preferred embodiment, the permanent magnets 28/30 are Grade N42 neodymium magnets (NdFeB), such as available from K&J Magnetics of Jamison, Pa., which are magnetically charged through their axis. Alternatively, other rare earth magnets, such as those known as samarium magnets (SmCo), may be utilized with the motor 10 of the present invention. Both the types of rare earth magnets identified above are at least generally adaptable to being manufactured in a variety of different sizes and shapes, are known to be generally corrosion and oxidation resistant and stable at higher temperatures. The shaft 62 of magnetic actuator 18 can be made out of wide variety of different materials. Although shaft 62 can be manufactured out of a nonferromagnetic material, including thermoplastic materials such as Delrin®, in the preferred embodiment the shaft 62 is manufactured from a ferrous material, such as case-hardened steel or the like. Utilizing a ferrous material for shaft 62 provides a magnetic advantage resulting from pulling the magnetic fields of the solenoid 16 and permanent magnets 28/30 inward toward the center of solenoid 16. Pulling these magnetic fields inward results in a stronger, more uniform magnetic pull/push effect over the stroke of the magnetic actuator 18, which improves the operation and output of the motor 10. Preferably, the shaft 62 is ground and finished to eliminate any irregular surfaces and provide a smooth exterior surface to reduce friction between the shaft 62 and the inside surface of the center section 36 of spool 38.

As with the solenoid 16, the permanent magnets 28/30 at the ends of shaft 62 are axially charged, not diametrically charged. To obtain the necessary attract and repel action of the magnetic actuator 18 in response to the alternating energized states 54/56 of the solenoid 16, the magnetic polarity at the second end 70 of first permanent magnet 28 and the magnetic polarity at the first end 72 of second permanent magnet 30 must both be the same (i.e., the actuator polarity 61 at both ends 70/72 should either be first polarity 58 or second polarity 60) so that one of the permanent magnets 28/30 will be attracted to its respective end 50/52 of solenoid 16 while the other permanent magnet 28/30 will be repelled by its respective end 50/52 of solenoid 16. For instance, in FIG. 6 the actuator polarity 61 is S and in FIG. 7 the actuator polarity is N. As shown in the second motor 10 from the left of the series of motors in FIGS. 6 and 7, with the solenoid 16 in the first energized state 54 the first permanent magnet 28 will be attracted to the solenoid 16 while the second permanent magnet 30 is being repelled by solenoid 16. As shown in the second motor 10 from the right of the series of motors in FIGS. 6 and 7, when the solenoid 16 is in its second energized state 56 the first permanent magnet 28 will be repelled by the solenoid 16 while second permanent magnet 30 is being attracted by solenoid 16. The switching of the polarity 58/60 of the ends 50/52 of solenoid 16, accomplished by switching mechanism 20, to alternate the solenoid 16 between its first 54 and second 56 energized states will reciprocate the magnetic actuator 18 relative to the fixed solenoid 16 (which is fixed by frame 12) to operate the work object 26, such as rotating a flywheel to generate electricity, propel a vehicle, pressurize a pump or accomplish a variety of other work objectives.

The shaft 62 can be a solid member or, as shown in FIGS. 9, 11-12 and 15, a hollow tubular member having an interior tubular chamber 76 defined by the inner wall or walls of shaft 62. In one embodiment, the tubular chamber 76 of shaft 62 aligns with the center aperture 78 of each of the first 28 and second 30 permanent magnets, as best shown in FIG. 9. In a preferred embodiment, the shaft 62 has a tubular chamber 76 at least at the first end 64 and second end 66 thereof and the permanent magnets 28/30 are solid and each as an extension member, shown as first extension member 80 for first permanent magnet 28 and second extension member 82 for second permanent magnet 30, that extend into the tubular chamber 76 at the ends 64/66 of shaft 62, as shown in FIGS. 11 and 12. In this embodiment, the tubular chamber 76 at the first 64 and second 66 ends of shaft 62 are sized and configured to receive the first 80 and second 82 extension members, respectively. The extension members 80/82 may attach to, connect to or be made integral with their respective ends 70/72 of the first 28 and second 30 permanent magnets. The extension members 80/82 have the same polarity 58/60 as the ends 70/72. In the preferred embodiment, the first extension member 80 has an inward end 84 and the second extension member 82 has an inward end 86 that are inwardly disposed toward each other, namely the inward end 84 of the first extension member 80 is directed toward the inward end 86 of the second extension member 82, in such a manner as to define a gap 88 inside the tubular chamber 76 of shaft 62, as shown in FIGS. 11 and 12. The inventor has found that the configuration with a gap 88 between the inward ends 84/86 of extension members 80/82 provides the best performance for this embodiment of motor 10 of the present invention. The length of extension members 80/82 and the resulting length of gap 88 that provides the optimum performance for motor 10 will likely depend on the various characteristics, including size and strength, of the permanent magnets 28/30 and the magnetic field of solenoid 16. In an alternative embodiment (not shown in the figures), the extension members 80/82 can extend completely toward each other, such that there is no gap 88, or the magnets 28/30 can even be a single piece.

Figure 5:
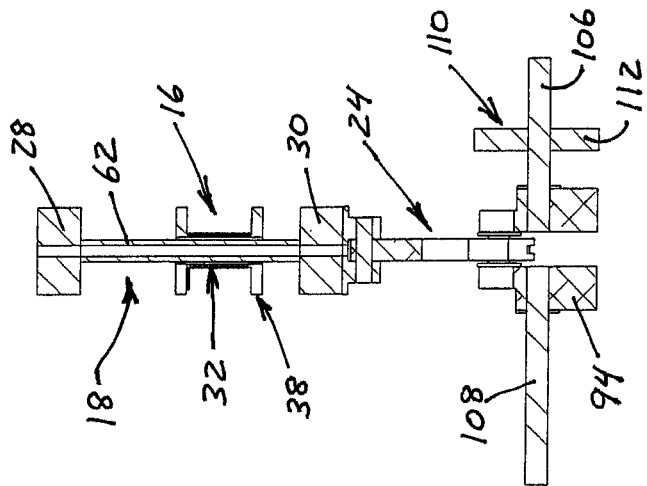
FIG. 5 is a cross-sectional front view of the magnetically actuated reciprocating motor of FIG. 4 taken through line 5-5 of FIG. 4.
Figure 4:
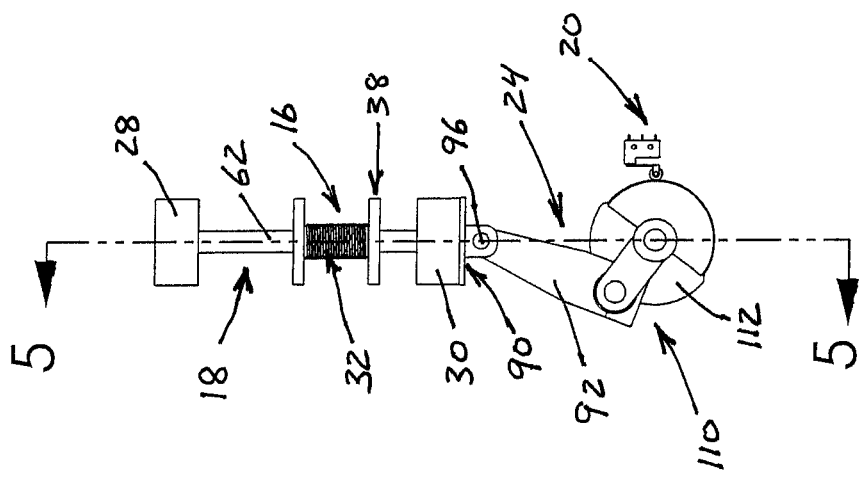
FIG. 4 is a side view of the magnetically actuated reciprocating motor of FIG. 1 shown without the housing.

As set forth above, the magnetic actuator 18 operatively connects to the reciprocating converting mechanism 24 for converting the linear reciprocating movement of magnetic actuator 18 to rotate work object 26 and accomplish the desired work objectives. In the preferred embodiment, the second end 28 of the magnetic actuator 18 attaches to the reciprocating converting mechanism 24, as best shown in FIGS. 8-9 and 14-15. In the embodiment shown in the figures, the reciprocating converting mechanism 24 comprises a typical piston/crankshaft arrangement comprising a connecting rod connector 90 at the second end 74 of the second permanent magnet 30, a connecting rod 92 and crankshaft 94. The connecting rod connector 90 is a pivot bracket that is fixedly attached to the second end 74 of the second permanent magnet 30 with a connecting pin 96 that is received in an aperture 98 at the first end 100 of the connecting rod 92 to allow the connecting rod 92 to pivot relative to the magnetic actuator 18. The second end 102 of connecting rod 92 comprises a clamp member 104 that attaches to the crankshaft 94. As best shown in FIGS. 2, 3 and 5, crankshaft 94 has first output shaft 106 and a second output shaft 108. In a preferred embodiment, the first output shaft 106 supports or attaches to a controlling mechanism, shown generally as 110, for controlling the timing/operation of the switching mechanism 20 to change the solenoid between its first magnetic state 54 and its second magnetic state 56 to reciprocate magnetic actuator 18. In this embodiment, the second output shaft 108 connects to and rotates work object 26. As will be readily familiar to those skilled in the art, appropriate bushings bearings, nuts and other devices must be utilized to secure work object 26 to second output shaft 108 such that the rotation of second output shaft 108, resulting from the rotation of crankshaft 94 due to the reciprocating motion of connecting rod 92 connected to magnetic actuator 18, rotates work object 26 as necessary to ensure the function and useful life of motor 10 of the present invention. As also known to those skilled in the art, various other configurations are suitable for use as reciprocating converting mechanism 24 for converting the linear reciprocating motion of the magnetic actuator 18 to the desired rotary motion of work object 26 (e.g., the flywheel).

As set forth above, first output shaft 106 of crankshaft 94 connects to the controlling mechanism 110 that is utilized to control the timing of the reverse magnetic switching of solenoid 16 necessary to obtain the reciprocating motion of the magnetic actuator 18. The interaction between controlling mechanism 110 and switching mechanism 20 provides the magnetic switching that reverses the polarity of the ends 50/52 of solenoid 16 directed towards the actuator polarity 61 of the second end 70 of first permanent magnet 28 and the actuator polarity 61 of the first end 72 of second permanent magnet 30. In the preferred embodiment of reciprocating motor 10 of the present invention, the controlling mechanism 110 is a cam 112 that rotates with the first output shaft 106 to operate, as appropriate, switching mechanism 20 to provide the reverse polarity operation necessary to reciprocate magnetic actuator 18. Because controlling mechanism 110 connects directly to the first output shaft 106 of crankshaft 94, no external energy source or prime mover is necessary to provide the polarity reversing that is essential to all magnetically actuated reciprocating motors, including reciprocating motor 10 of the present invention. As the cam 112 reciprocates, it operatively contacts the switching mechanism 20 to rapidly switch the solenoid 16 between its first energized state 54 and its second energized state 56.

In the preferred embodiment of motor 10 of the present invention, the source of power 22 provides direct current to the coil 32 of the solenoid 16 to energize the solenoid 16 and produce the electromagnetic field that provides the alternating first polarity 58 and second polarity 60 at the first 50 and second 53 ends of the solenoid 16. Preferably, the first wire end 46 and second wire end 48 connect, via the switching mechanism 20, to a rechargeable battery (as the source of power 22). The rechargeable battery can be charged by the generation of electricity from motor 12 and/or other sources (e.g., A/C power, solar, wind and etc.). The switching mechanism 20 utilizes a pair of single pull double throw switches, shown as 114 and 116 on FIG. 16, that are activated by the movement of cam 112 to produce a two stroke magnetic force motor 10. The reverse magnetic switching of the axially charged solenoid 16 operates in conjunction with the axially charged permanent magnets 28/30 to reciprocate the magnetic actuator 18 and rotate the work object 24 that is utilized, as described above, to accomplish a work objective. An on/off switch 118 is used to initiate or cease operation of motor 10.

As best shown in FIGS. 6 and 7, the magnetic actuator 18 defines a reciprocating support structure for the permanent magnets 28/30 at the opposite ends thereof. The frame 12 fixedly supports the solenoid 16, which produces an axially charged electromagnetic field when energized by the source of power 22 via the switching mechanism 20. The permanent magnets 28/30 each direct a common actuator polarity 61, such as north (N) or south (S), towards the solenoid 16 that is fixedly positioned between the reciprocating permanent magnets 28/30 at the opposite ends 64/66 of the shaft 62 that interconnects the permanent magnets 28/30. As shown in FIGS. 6 and 7, in one embodiment the actuator polarity 61 of the permanent magnets 28/30 that is directed toward the solenoid 16 is a first polarity N and in another embodiment the actuator polarity 61 of the permanent magnets 28/30 that is directed toward the solenoid 16 is S. Although whether actuator polarity 61 of the permanent magnets 28/30 is N or S is not specifically important, it is important that their magnet polarity be the same and be fixed in either a N or S orientation so that the switching mechanism 20 can provide the reverse magnetic switching that reciprocates the magnetic actuator 18 and operates the work object 22 to provide the desired work objective.

Figure 19:
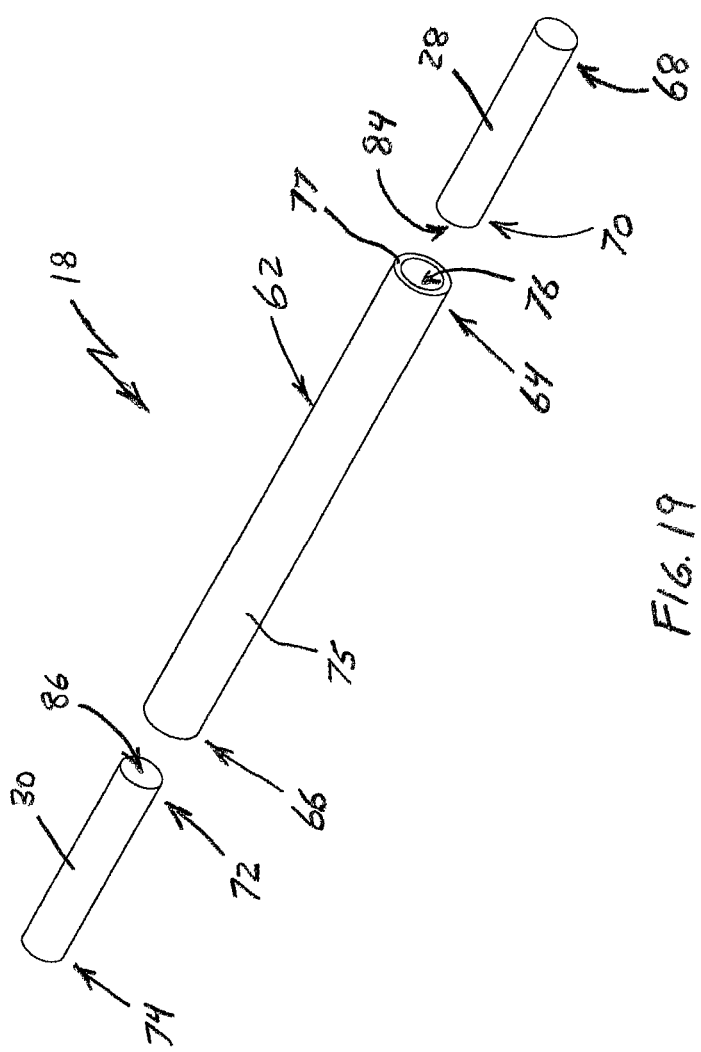
FIG. 19 is an exploded side perspective view of the magnetic actuator of FIG. 17.

In the preferred embodiment of the present invention, shown in FIGS. 17 through 19, the shaft 62 comprises a tubular member 75 having interior tubular chamber 76 defined by the inside surface of the one or more walls 77 of shaft 62, as best shown in FIG. 19. In this embodiment, the permanent magnets 28/30 are solid and disposed entirely or at least substantially inside the tubular chamber 76 of shaft 62, as shown in FIG. 18. In effect, this embodiment replaces or combines the extension members 80/82 with the permanent magnets 28/30 such that there is little or no substantial amount of the permanent magnets 28/30 extending beyond the ends 64/66, respectively, of the shaft 62. Tubular chamber 76, at least towards the first 64 and second 66 ends of shaft 62, is sized and configured to receive the first permanent magnet 28 and second permanent magnet 30, respectively. The second end 70 of the first permanent magnet 28 has the same polarity 58/60, which will be the actuator polarity 61, as the first end 72 of the second permanent magnet 30. The first end 68 of the first permanent magnet 28 has the same polarity 58/60 as the second end 74 of the second permanent magnet 30. The inward end 84 of the first permanent magnet 28, which was the inward end 84 of the first extension member 80 in the embodiment of FIGS. 11 and 12, is directed toward and in spaced apart relation to the inward end 86 of the second permanent magnet 30, which was the inward end 86 of the second extension member 82 in the embodiment of FIGS. 11 and 12, so as to define the gap 88 inside the tubular chamber 76 of shaft 62. The inventor has found that this configuration provides the best performance for motor 10 of the present invention. The length of permanent magnets 28/30 inside shaft 62 and the resulting length of gap 88 that provides the optimum performance for motor 10 will likely depend on the various characteristics, including size and strength, of the permanent magnets 28/30 and the magnetic field of the solenoid 16. The magnetic actuator 18 of this embodiment eliminates the cost and weight of having the larger-sized permanent magnets 28/30 positioned at the ends 64/66, and extending outwardly therefrom, of shaft 62 of the embodiment shown in FIGS. 10 through 12. The inventor has found that the positioning of permanent magnets 28/30 substantially entirely inside the shaft 62, at or near the ends 64/66 thereof, provides improved performance for motor 10 at lower cost.

Figure 21:
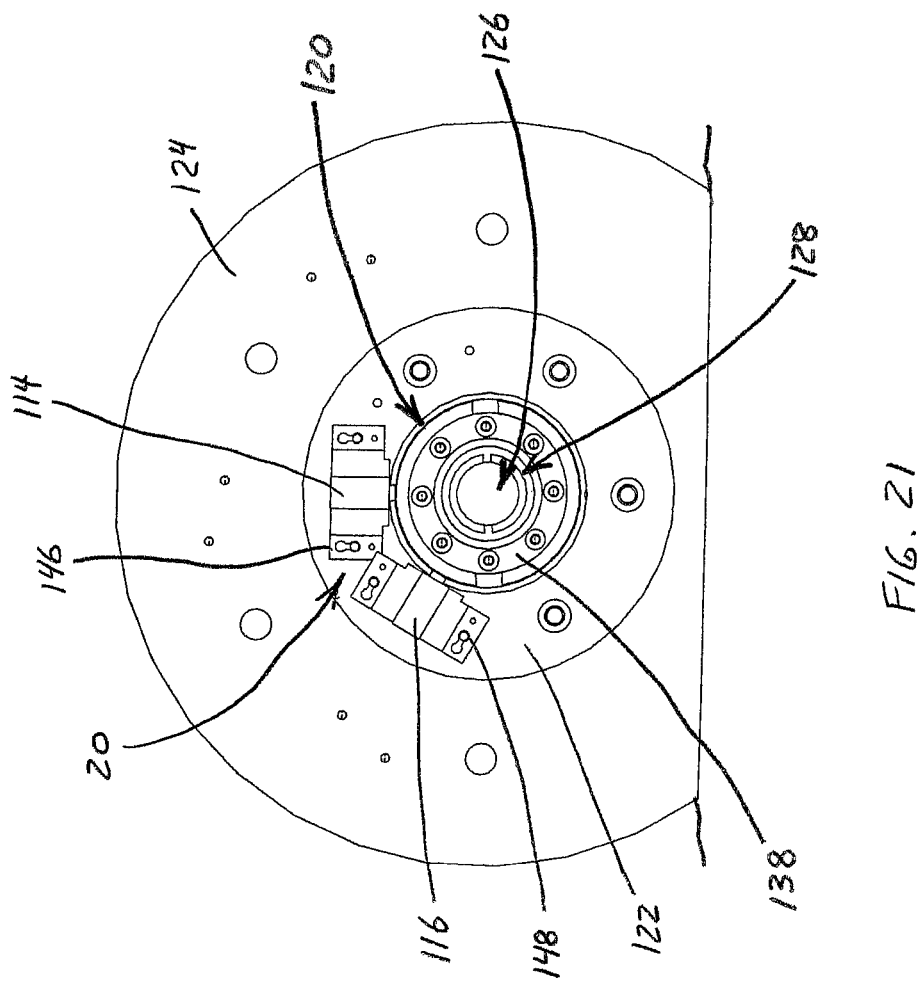
FIG. 21 is a front view of the split commutator controlling mechanism of FIG. 20 shown without the first output shaft.
Figure 20:
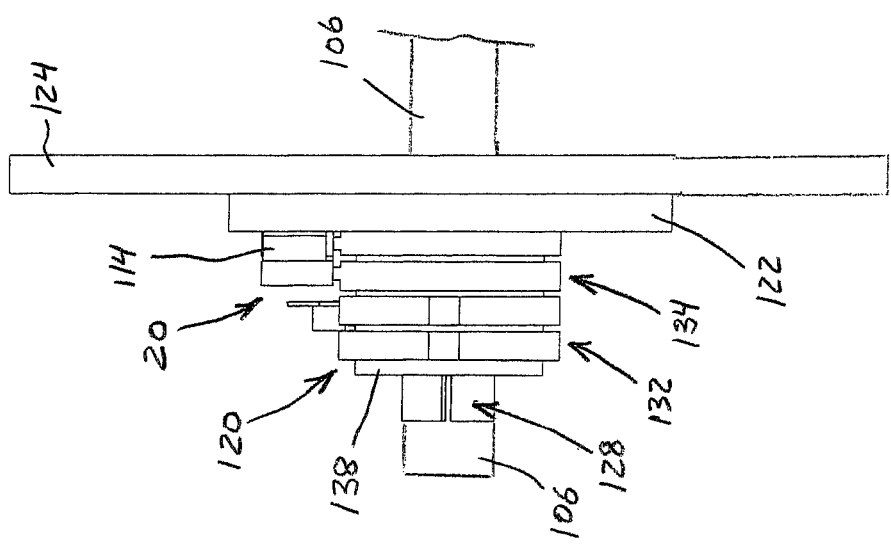
FIG. 20 is a side view split commutator controlling mechanism for use with the motor of the present invention shown mounted to the first output shaft with the switching mechanism mounted to stationary plates.

In the embodiment described above, cam 112 is utilized as the controlling mechanism 110 that controls the operation and timing of the reverse magnetic switching, by reversing the polarity of the ends 50/52 of the solenoid 16, required to reciprocate the magnetic actuator 18. In an alternative embodiment, the controlling mechanism 110 is a commutator, such as the split commutator 120 shown in FIGS. 20 through 23. As with the cam 112, split commutator 120 is mounted or attached to first output shaft 106, as shown in FIG. 20, so as to rotate therewith in response to the reciprocation of magnetic actuator 18 and operatively engaged with switching mechanism 20 to provide the reverse magnetic switching that reverses the polarity of the ends 50/52 of solenoid 16. In the embodiment shown in FIGS. 20 and 21, the switching mechanism 20 is mounted or otherwise attached to a switch mounting plate 122 that is mounted, attached or integral with a flywheel mounting plate 124, which in one embodiment is fixedly mounted to the frame 12. The controlling mechanism 110 rotates with first output shaft 106, which rotates as a result of the reciprocation of the magnetic actuator 18 and the reciprocating converting mechanism 24, in relation to the switching mechanism 20 on the stationary mounting plates 122/124. The rotation of the controlling mechanism 110, in cooperative engagement with the switching mechanism 20, provides the reverse magnetic switching. In the embodiment shown, the first output shaft 106 is received through the center opening 126, best shown in FIGS. 21 and 23, through the center of split commutator 120 and the split commutator 120 includes a first clamp mechanism 128 and a second clamp mechanism 130 on opposite sides of the split commutator 120, as best shown in FIGS. 20 and 22, that clamps onto, or otherwise engages, the first output shaft 106.

Figure 23:
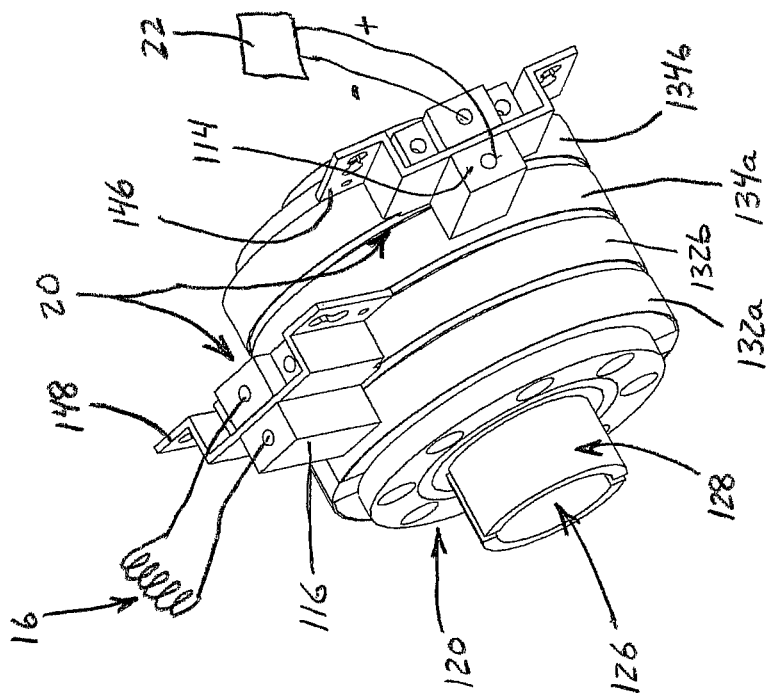
FIG. 23 is a top perspective view of the split commutator controlling mechanism of FIG. 22 shown electrically coupled to the solenoid and source of power.
Figure 22:
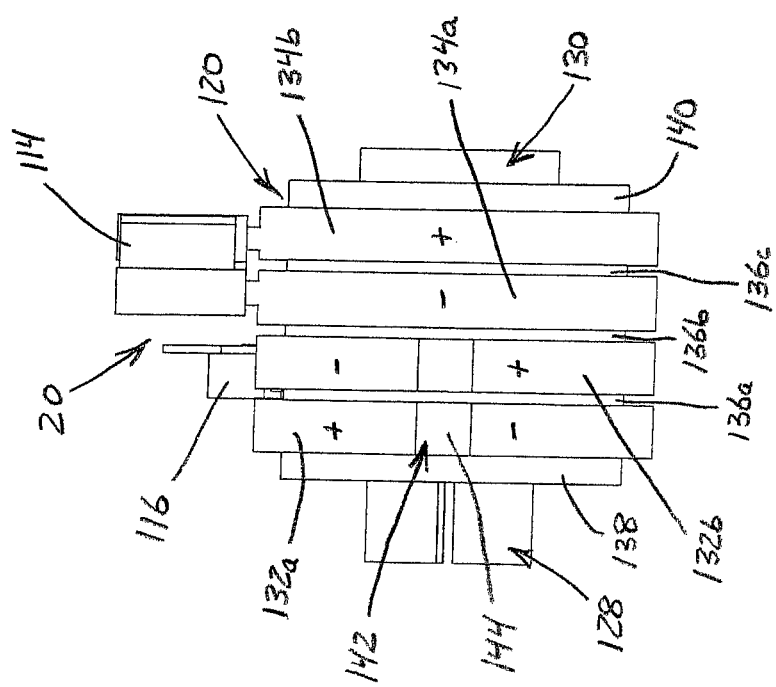
FIG. 22 is a side view of the split commutator controlling mechanism and switching mechanism of FIG. 21 shown without the stationary plates.

The splint commutator 120 of the embodiment shown in FIGS. 20 through 23 comprises a pair of split disks 132, shown as first split disk 132a and 132b, and a pair of solid disks 134, shown as first solid disk 134a and second solid disk 134b, that are separated by disk insulators 136, shown as 136a, 136b and 136c in FIGS. 22 and 23. A first end insulator 138 separates the first split disk 132a from the first clamp mechanism 128 and a second end insulator 140 separates the second solid disk 134b from the second clamp mechanism 130, as best shown in FIG. 22. Each of the split disks 132a/132b have a split section 142 on each side of split commutator 120 with a split insulator 144 disposed therein to separate the ends of the split disks 132a/132b. In one embodiment, both the split disks 136 and solid disks 138 are made out of copper. As well known in the art, a variety of other electrical conducting materials can be utilized for disks 136/138. Likewise, a variety of insulating materials, including those set forth above, can be utilized for disk insulators 136, first end insulator 138, second end insulator 140 and split insulators 144. Mounting brackets 146 and 148, best shown in FIG. 23, mount the switches 114/116, respectively, to the switch mounting plate 122.

The magnetic polarity relationships and electrical connections that are associated with split commutator 120 are best shown in FIGS. 22 and 23. FIG. 22 shows one embodiment of the relationship between the magnetic polarities of the split disks 132 and the solid disks 134. FIG. 23 shows the electrical current input to split commutator 120 from the source of power 22, such as a battery, to SPDT switch 114 and the electrical current output to the solenoid 16, which provides the magnetic switching to reciprocatively drive the magnetic actuator 18 that rotates output shafts 106/108.

Figure 24:
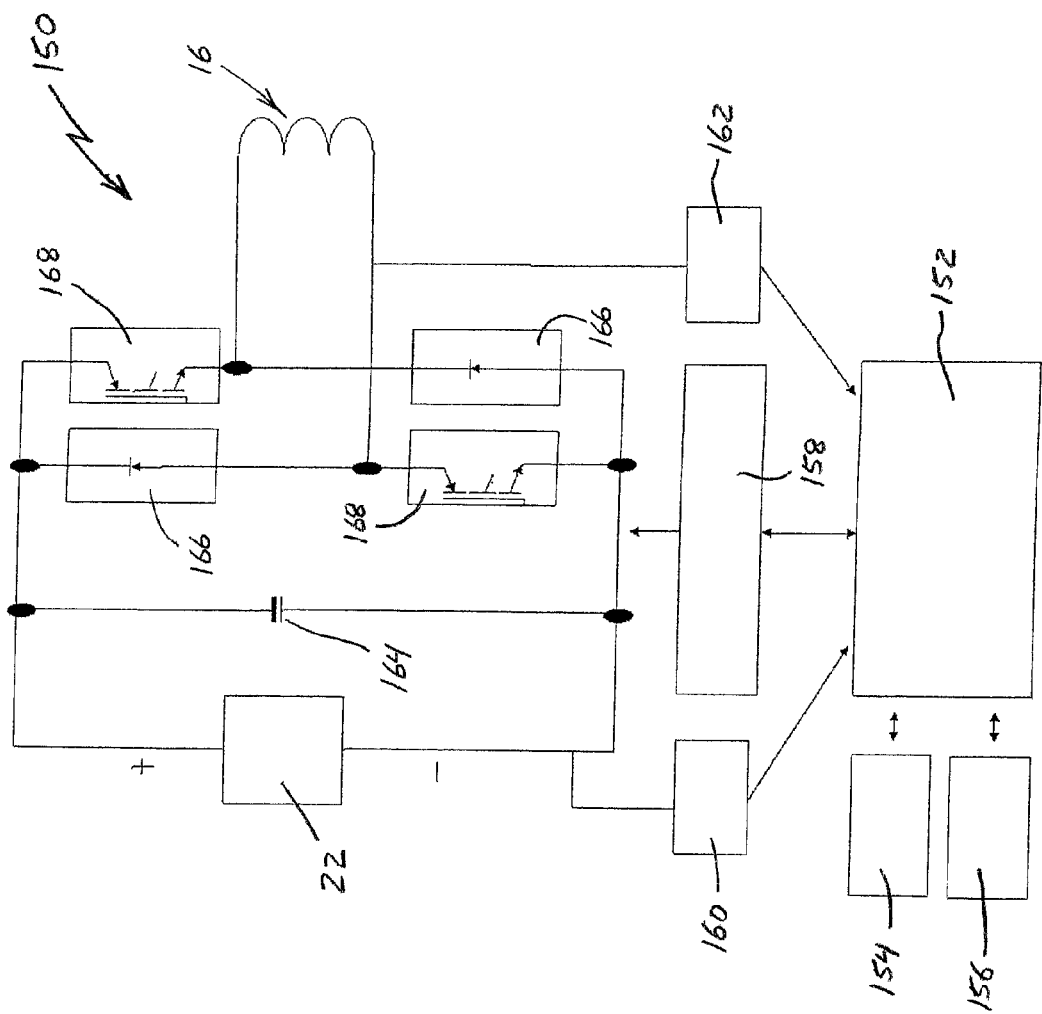
FIG. 24 is a schematic view of a electronic drive assembly controlling mechanism for use with the motor of the present invention.

In another alternative embodiment, the controlling mechanism 110 is a electronic drive assembly 150, with an exemplary schematic therefor shown in FIG. 24. As with the other controlling mechanisms 110 described herein, the electronic drive assembly 150 is configured to receive electrical power from the source of power 22 and transfer it to the solenoid 16 in a manner that provides the reverse magnetic switching required to reciprocatively drive the magnetic actuator 18. A control unit 152, wirelessly or wire connected to a bus transistor 154 for data interface to the control unit 152 and a user interface 156 for a front panel controller VFD/LED, is configured with a microprocessor or the like to provide the data processing and like operations that control the electronic drive assembly 150. The control unit 152 cooperatively engages a half bridge driver 158, comprising an electronic circuit that enables voltage to be applied across a load in either direction, and receives and processes electronic signals from an input sensor 160 and an output sensor 162 that are used to control half-bridge driver 158, as shown in FIG. 24. Control unit 152 communicates with half bridge driver 158 either wirelessly or with a wired connection. In one embodiment, half bridge driver 158 is an inverter that converts DC power to AC power. Electronic drive assembly 150 also comprises appropriately configured capacitor 164, diodes 166 and transistors 168, such as insulated-gate bipolar transistors or IGBTs that are known for high efficiency and fast switching. The exemplary electronic drive assembly 150 described above is utilized in place of the previously described split commutator 120. One advantage of the electronic drive assembly 150 over the split commutator 120 is that the electronic drive assembly 150 eliminates sparking, which represents loss of energy that could otherwise be utilized in a system to provide the desired work output.

In use, the periodic switching of first polarity 58 and second polarity 60 at the ends 50/52 of solenoid 16 produce an axially charged electromagnetic field toward the first end 70 of the first permanent magnet 28 and the second end 72 of the second permanent magnet 30 will alternatively repel and attract the permanent magnets 28/30 to reciprocate the magnetic actuator 18 relative to the solenoid 16 and frame 12 (which fixedly supports the solenoid 16 and crankshaft 94). The reciprocation of the magnetic actuator 18 will, by way of the connecting rod 92, rotatably drive crankshaft 94, which rotatably engages the controlling mechanism 110 at first output shaft 106 of crankshaft 94 to operate the switching mechanism 20 that provides the timing necessary for the reverse magnetic switching of the solenoid 16 and rotates the work object 26 at the second output shaft 108. As such, the magnetically actuated reciprocating motor 10 of the present invention does not require any external power source or prime mover to provide the necessary polarity shifting for reciprocation of the magnetic actuator 18, thereby making the present motor more efficient and useful for obtaining a work output, such as to operate a pump, generator or vehicle. Use of the reciprocating motor 10 of the present invention eliminates the energy demands and pollution associated with presently available reciprocating motors.

While there are shown and described herein one or more specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A magnetically actuated reciprocating motor, comprising:
   a frame;
   a solenoid fixedly supported by said frame, said solenoid having a first end and an opposite directed second end, said solenoid configured to have a first polarity at said first end and a second polarity at said second end in a first energized state and said second polarity at said first end and said first polarity at said second end in a second energized state, said solenoid comprising a spool having a coil of a wire wrapped around a center section, said center section having a generally open center;
   a magnetic actuator reciprocally received in said open center of said coil, said magnetic actuator having an elongated tubular shaft with one or more walls defining a tubular chamber between a first end and a second end of said shaft, a first permanent magnet disposed inside said tubular chamber at said first end of said shaft and a second permanent magnet disposed inside said tubular chamber at said second end of said shaft, said first permanent magnet having an end disposed toward said first end of said solenoid that is magnetically charged with an actuator polarity that is one of said first polarity and said second polarity, said second permanent magnet having an end disposed toward said second end of said solenoid that is magnetically charged with said actuator polarity;
   means operatively interconnecting said magnetic actuator and a work object for converting reciprocating movement of said magnetic actuator to rotating movement so as to rotate said work object;
   a source of power configured to electromagnetically energize said solenoid;
   switching means electrically interconnecting said source of power and said solenoid for alternatively switching said solenoid between said first energized state and said second energized state; and
   controlling means operatively engaged with said switching means for controlling the operation and timing of said switching means so as to switch said solenoid between said first energized state and said second energized state to reciprocatively drive said magnetic actuator relative to said solenoid and rotate said work object.

2. The reciprocating motor according to claim 1, wherein said first permanent magnet has a first end at said first end of said shaft and a second end disposed inwardly from said first end of said shaft, said second end of said first permanent magnet disposed toward said first end of said solenoid and magnetically charged with said actuator polarity, said second permanent magnet having a first end disposed inwardly from said second end of said shaft and a second end at said second end of said shaft, said first end of said second permanent magnet disposed toward said second end of said solenoid and magnetically charged with said actuator polarity, said second end of said first permanent magnet in spaced apart relation with said first end of said second permanent magnet so as to define a gap between an inward end of said first permanent magnet and an inward end of said second permanent magnet in said tubular chamber of said shaft.

3. The reciprocating motor according to claim 1, wherein said shaft of said magnetic actuator is reciprocatively received in said open center of said center section.

4. The reciprocating motor according to claim 1, wherein said spool further comprises a first end section and a second end section, said center section disposed between said first end section and said second end section, each of said first end section and said second end section fixedly supported by said frame.

5. The reciprocating motor according to claim 4, wherein said spool of said solenoid is made from one or more nonferromagnetic materials with no ferromagnetic core.

6. The reciprocating motor according to claim 1, wherein said converting means comprises at least a first output shaft operatively connected to said magnetic actuator so as to rotate as a result of the reciprocative movement of said magnetic actuator and operatively connected to said controlling means so as to operate said controlling means.

7. The reciprocating motor according to claim 6, wherein said converting means further comprises a connecting rod having a first end and a second end and a crankshaft defining said first output shaft and a second output shaft, said first end of said connecting rod pivotally attached to said magnetic actuator, said second end of said connecting rod attached to said crankshaft and configured to rotate said crankshaft, said second output shaft connected to said work object so as to rotate said work object.

8. The reciprocating motor according to claim 1, wherein said controlling means is a cam.

9. The reciprocating motor according to claim 1, wherein said controlling means is a commutator.

10. The reciprocating motor according to claim 9, wherein said commutator comprises a pair of split disks, a pair of solid disks and a disk insulator separating each of said split disks and said solid disks.

11. The reciprocating motor according to claim 1, wherein said controlling means is an electronic drive assembly.

12. A magnetically actuated reciprocating motor, comprising:
a frame;
a solenoid fixedly supported by said frame, said solenoid having a first end, an opposite directed second end and a spool having a coil of wire wrapped around a center section between said first end and said second end, said center section having a generally open center therethrough, said solenoid configured to have a first polarity at said first end and a second polarity at said second end in a first energized state and said second polarity at said first end and said first polarity at said second end in a second energized state;
a magnetic actuator reciprocally disposed through said solenoid, said magnetic actuator having an elongated tubular shaft with one or more walls defining a tubular chamber between a first end and a second end of said shaft, a first permanent magnet disposed inside said tubular chamber at said first end of said shaft and a second permanent magnet disposed inside said tubular chamber at said second end of said shaft, said shaft reciprocatively received in said open center of said center section, said first permanent magnet having a first end at said first end of said shaft and a second end disposed inwardly from said first end of said shaft, said second end of said first permanent magnet magnetically charged with an actuator polarity that is one of said first polarity and said second polarity, said second permanent magnet having a first end disposed inwardly from said second end of said shaft and a second end at said second end of said shaft, said first end of said second permanent magnet magnetically charged with said actuator polarity, said second end of said first permanent magnet in spaced apart relation with said first end of said second permanent magnet so as to define a gap between an inward end of said first permanent magnet and an inward end of said second permanent magnet in said tubular chamber of said shaft;
means operatively interconnecting said magnetic actuator and a work object for converting reciprocating movement of said magnetic actuator to rotating movement so as to rotate said work object, said converting means comprising at least a first output shaft operatively connected to said magnetic actuator so as to rotate as a result of the reciprocative movement of said magnetic actuator;
a source of power configured to electromagnetically energize said solenoid;
switching means electrically interconnecting said source of power and said solenoid for alternatively switching said solenoid between said first energized state and said second energized state; and
controlling means connected to said first output shaft and operatively engaged with said switching means for controlling the operation and timing of said switching means so as to switch said solenoid between said first energized state and said second energized state to reciprocatively drive said magnetic actuator relative to said solenoid and rotate said work object.

13. The reciprocating motor according to claim 12, wherein said solenoid comprises a spool with a first end section at said first end and a second end section at said second end, said center section disposed between said first end section and said second end section, each of said first end section and said second end section fixedly supported by said frame.

14. The reciprocating motor according to claim 13, wherein said spool of said solenoid is made from one or more nonferromagnetic materials with no ferromagnetic core.

15. The reciprocating motor according to claim 12, wherein said converting means further comprises a connecting rod having a first end and a second end and a crankshaft defining said first output shaft and a second output shaft, said first end of said connecting rod pivotally attached to said magnetic actuator, said second end of said connecting rod attached to said crankshaft and configured to rotate said crankshaft, said second output shaft connected to said work object and configured to rotate said work object.

16. The reciprocating motor according to claim 12, wherein said controlling means is a cam.

17. The reciprocating motor according to claim 12, wherein said controlling means is a commutator.

18. The reciprocating motor according to claim 17, wherein said commutator comprises a pair of split disks, a pair of solid disks and a disk insulator separating each of said split disks and said solid disks.

19. The reciprocating motor according to claim 12, wherein said controlling means is an electronic drive assembly.

20. A magnetically actuated reciprocating motor, comprising:
a frame;
a solenoid fixedly supported by said frame, said solenoid having a first end, an opposite directed second end and a spool having a coil of wire wrapped around a tubular center section disposed between said first end and said second end of said solenoid, said center section having a generally open center therethrough, said spool made out of one or more nonferromagnetic materials with no ferromagnetic core, said solenoid configured to have a first polarity at said first end and a second polarity at said second end in a first energized state and said second polarity at said first end and said first polarity at said second end in a second energized state;
a magnetic actuator reciprocally received in said open center of said coil, said magnetic actuator having an elongated tubular shaft with one or more walls defining a tubular chamber between a first end and a second end of said shaft, a first permanent magnet disposed inside said tubular chamber at said first end of said shaft and a second permanent magnet disposed inside said tubular chamber at said second end of said shaft, said shaft reciprocatively received in said open center of said center section, said first permanent magnet having a first end at said first end of said shaft and a second end disposed inwardly from said first end of said shaft, said second end of said first permanent magnet magnetically charged with an actuator polarity that is one of said first polarity and said second polarity, said second permanent magnet having a first end disposed inwardly from said second end of said shaft and a second end at said second end of said shaft, said first end of said second permanent magnet magnetically charged with said actuator polarity, said second end of said first permanent magnet in spaced apart relation with said first end of said second permanent magnet so as to define a gap between an inward end of said first permanent magnet and an inward end of said second permanent magnet in said tubular chamber of said shaft;

means operatively interconnecting said magnetic actuator and a work object for converting reciprocating movement of said magnetic actuator to rotating movement to rotate said work object, said converting means comprising a connecting rod having a first end and a second end and a crankshaft defining a first output shaft and a second output shaft, said first end of said connecting rod attached to said magnetic actuator and said second end of said connecting rod attached to said crankshaft so as to rotate said crankshaft upon reciprocating movement of said magnetic actuator, each of said first output shaft and said second output shaft configured to rotate as a result of the rotating movement of said crankshaft, said second output shaft connected to said work object so as to rotate said work object;

a source of power configured to electromagnetically energize said solenoid;

switching means electrically interconnecting said source of power and said solenoid for alternatively switching said solenoid between said first energized state and said second energized state; and controlling means connected to said first output shaft and operatively engaged with said switching means for controlling the operation and timing of said switching means so as to switch said solenoid between said first energized state and said second energized state upon rotation of said first output shaft so as to reciprocatively drive said magnetic actuator relative to said solenoid and rotate said work object; said controlling means comprising at least one of a cam, a commutator and an electronic drive assembly.

* * * * *